_(List continued on next page.)_

United States Patent [19]
Kasanami et al.

[11] Patent Number: 6,016,699
[45] Date of Patent: *Jan. 25, 2000

[54] VIBRATOR INCLUDING PIEZOELECTRIC ELECTRODES OF DETECTORS ARRANGED TO BE NON-PARALLEL AND NON-PERPENDICULAR TO CORIOLIS FORCE DIRECTION AND VIBRATORY GYROSCOPE USING THE SAME

[75] Inventors: Tohru Kasanami; Takeshi Nakamura; Keiichi Okano; Yoshiko Morishita, all of Nagaokakyo, Japan

[73] Assignee: Murata Manufacturing Co., Ltd., Japan

[*] Notice: This patent is subject to a terminal disclaimer.

[21] Appl. No.: 09/163,829

[22] Filed: Sep. 1, 1998

Related U.S. Application Data

[62] Division of application No. 08/584,472, Jan. 11, 1996, Pat. No. 5,874,674, which is a division of application No. 08/263,894, Jun. 22, 1994, Pat. No. 5,505,085, which is a division of application No. 08/044,630, Apr. 12, 1993, Pat. No. 5,349,857, which is a division of application No. 07/835,087, Feb. 18, 1992, abandoned, which is a continuation of application No. 07/525,821, May 21, 1990, abandoned, which is a division of application No. 07/391,825, Aug. 10, 1989, abandoned.

[30] Foreign Application Priority Data

| Aug. 12, 1988 | [JP] | Japan | 63-202385 |
| Feb. 25, 1989 | [JP] | Japan | 1-44806 |
| Feb. 25, 1989 | [JP] | Japan | 1-44807 |
| Apr. 6, 1989 | [JP] | Japan | 1-89396 |
| Apr. 6, 1989 | [JP] | Japan | 1-89397 |
| Apr. 6, 1989 | [JP] | Japan | 1-89398 |
| May 8, 1989 | [JP] | Japan | 1-115436 |
| May 8, 1989 | [JP] | Japan | 1-115437 |
| May 12, 1989 | [JP] | Japan | 1-120102 |
| Jun. 9, 1989 | [JP] | Japan | 1-147779 |
| Jun. 9, 1989 | [JP] | Japan | 1-147782 |

[51] Int. Cl.$^7$ .................................................. G01P 9/04
[52] U.S. Cl. ........................................ 73/504.14; 310/316
[58] Field of Search ...................... 73/504.12, 504.14; 310/316, 321, 348, 353, 329

[56] References Cited

U.S. PATENT DOCUMENTS

| 2,271,200 | 1/1942 | Mason . | |
| 2,439,499 | 4/1948 | William et al. . | |
| 3,258,617 | 6/1966 | Hart et al. | 310/9.8 |
| 3,354,413 | 11/1967 | Ko | 310/321 X |

_(List continued on next page.)_

FOREIGN PATENT DOCUMENTS

| 50-18178 | 6/1948 | Japan . |
| 57-113521 | 12/1955 | Japan . |

OTHER PUBLICATIONS

Electronic Telecommunication Society Theses '85/6 vol. J68–A No. 6, "Talks on Technology", by Konno et al.

*Primary Examiner*—Hezron Williams
*Assistant Examiner*—Helen C. Kwok
*Attorney, Agent, or Firm*—Graham & James LLP

[57] ABSTRACT

A method of forming a vibrating gyroscope includes the steps of providing a vibrating body and disposing at least one driving member on the vibrating body so that the at least one driving member is arranged to generate vibration in the vibrating body in a vibrating direction that is substantially perpendicular to an axis of the vibrating body. Then, at least two detection members are disposed on the vibrating body such that the at least two detection members are spaced from each other, located on opposite sides of a plane including the axis and the vibrating direction of the vibrating body, arranged to detect a rotational angular velocity applied to the vibrating body and arranged in a non-parallel relationship relative to each other and in a non-parallel relationship relative to the at least one driving member.

36 Claims, 31 Drawing Sheets

U.S. PATENT DOCUMENTS

| | | | |
|---|---|---|---|
| 3,520,195 | 7/1970 | Tehon | 73/505 |
| 3,566,313 | 2/1971 | Yuki et al. | 310/321 |
| 3,612,749 | 10/1971 | Grube | 310/345 X |
| 3,754,153 | 8/1973 | Carpenter | 310/348 |
| 3,805,509 | 4/1974 | Assmus et al. | 310/345 X |
| 3,839,915 | 10/1974 | Schlitt . | |
| 3,931,600 | 1/1976 | Nagashima et al. | 333/186 |
| 4,027,181 | 5/1977 | Moreillon et al. | 310/348 |
| 4,124,829 | 11/1978 | Kuenemund | 333/186 |
| 4,328,442 | 5/1982 | Tanaka et al. | 310/326 |
| 4,409,836 | 10/1983 | Comroe et al. | 73/505 |
| 4,489,609 | 12/1984 | Burdess et al. | 310/329 |
| 4,655,081 | 4/1987 | Burdess | 310/329 |
| 4,689,992 | 9/1987 | Strachan . | |
| 4,836,023 | 6/1989 | Oikawa | 310/351 X |
| 5,049,776 | 9/1991 | Ogawa | 310/321 X |
| 5,111,083 | 5/1992 | Nakamura | 307/527 |
| 5,117,148 | 5/1992 | Nakamura et al. | 310/527 |
| 5,118,981 | 6/1992 | Kobayashi et al. | 310/345 X |
| 5,220,833 | 6/1993 | Nakamura et al. | 73/505 |
| 5,256,929 | 10/1993 | Terajima | 310/345 X |
| 5,336,960 | 8/1994 | Shimizu et al. | 73/504.12 |
| 5,345,822 | 9/1994 | Nakamura et al. | 73/505 |
| 5,349,856 | 9/1994 | Nakamura | 73/505 |
| 5,349,857 | 9/1994 | Kasanami et al. | 73/505 |
| 5,493,166 | 2/1996 | Kasanami et al. | 310/351 |
| 5,505,085 | 4/1996 | Kasanami et al. | 73/504.14 |
| 5,569,969 | 10/1996 | Kasanami et al. | 310/345 |
| 5,874,674 | 2/1999 | Kasanami et al. | 73/504.14 |

FOREIGN PATENT DOCUMENTS

| | | |
|---|---|---|
| 52-79793 | 7/1970 | Japan . |
| 57-21130 | 6/1977 | Japan . |
| 58-221109 | 12/1983 | Japan . |
| 59-151016 | 8/1984 | Japan . |
| 60-49216 | 3/1985 | Japan . |
| 60-56275 | 4/1985 | Japan . |
| 60-61613 | 4/1985 | Japan . |
| 60-185111 | 9/1985 | Japan . |
| 61-102519 | 5/1986 | Japan . |
| 61-86612 | 5/1986 | Japan . |
| 61-164109 | 7/1986 | Japan . |
| 61-191916 | 8/1986 | Japan . |
| 61-191918 | 8/1986 | Japan . |
| 61-247915 | 11/1986 | Japan . |
| 61-256217 | 11/1986 | Japan . |
| 62-19714 | 1/1987 | Japan . |
| 62-52410 | 3/1987 | Japan . |
| 62-148812 | 7/1987 | Japan . |
| 62-234407 | 10/1987 | Japan . |
| 63-5436 | 1/1988 | Japan . |
| 63-38110 | 2/1988 | Japan . |
| 63-67921 | 5/1988 | Japan . |
| 63-67922 | 5/1988 | Japan . |
| 64-15114 | 1/1989 | Japan . |
| 03/13006 | 1/1991 | Japan . |
| 2061502 | 5/1981 | United Kingdom . |
| 2215054 | 9/1989 | United Kingdom . |

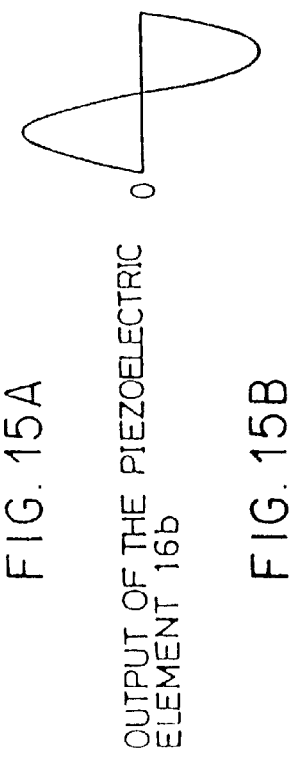
FIG. 14A
OUTPUT OF THE PIEZOELECTRIC ELEMENT 16b
FIG. 14B
OUTPUT OF THE PIEZOELECTRIC ELEMENT 16c
FIG. 14C
OUTPUT OF THE VARIABLE RESISTANCE 102
FIG. 14D
OUTPUT OF THE DIFFERENCIAL AMPLIFIER 150
FIG. 15A
OUTPUT OF THE PIEZOELECTRIC ELEMENT 16b
FIG. 15B
OUTPUT OF THE PIEZOELECTRIC ELEMENT 16c
FIG. 15C
OUTPUT OF THE VARIABLE RESISTANCE 102
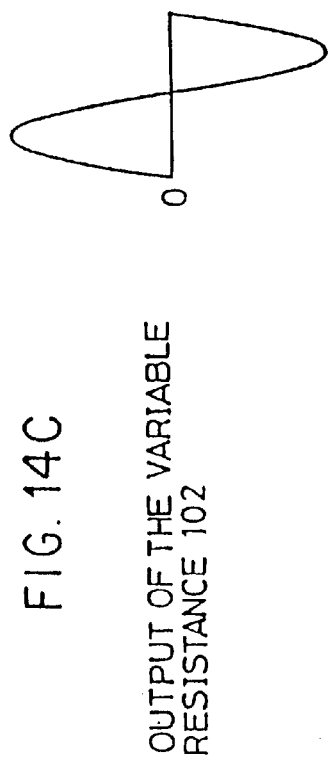
FIG. 15D
OUTPUT OF THE DIFFERENCIAL AMPLIFIER 150

F I G. 17
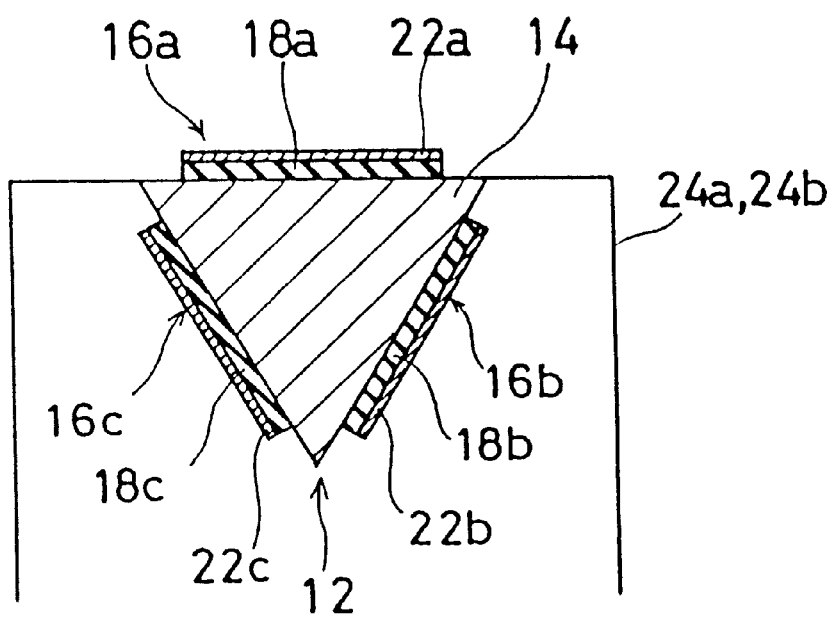

OUTPUT VOLTAGE CHARACTERISTICS (ERECT)

F I G. 45
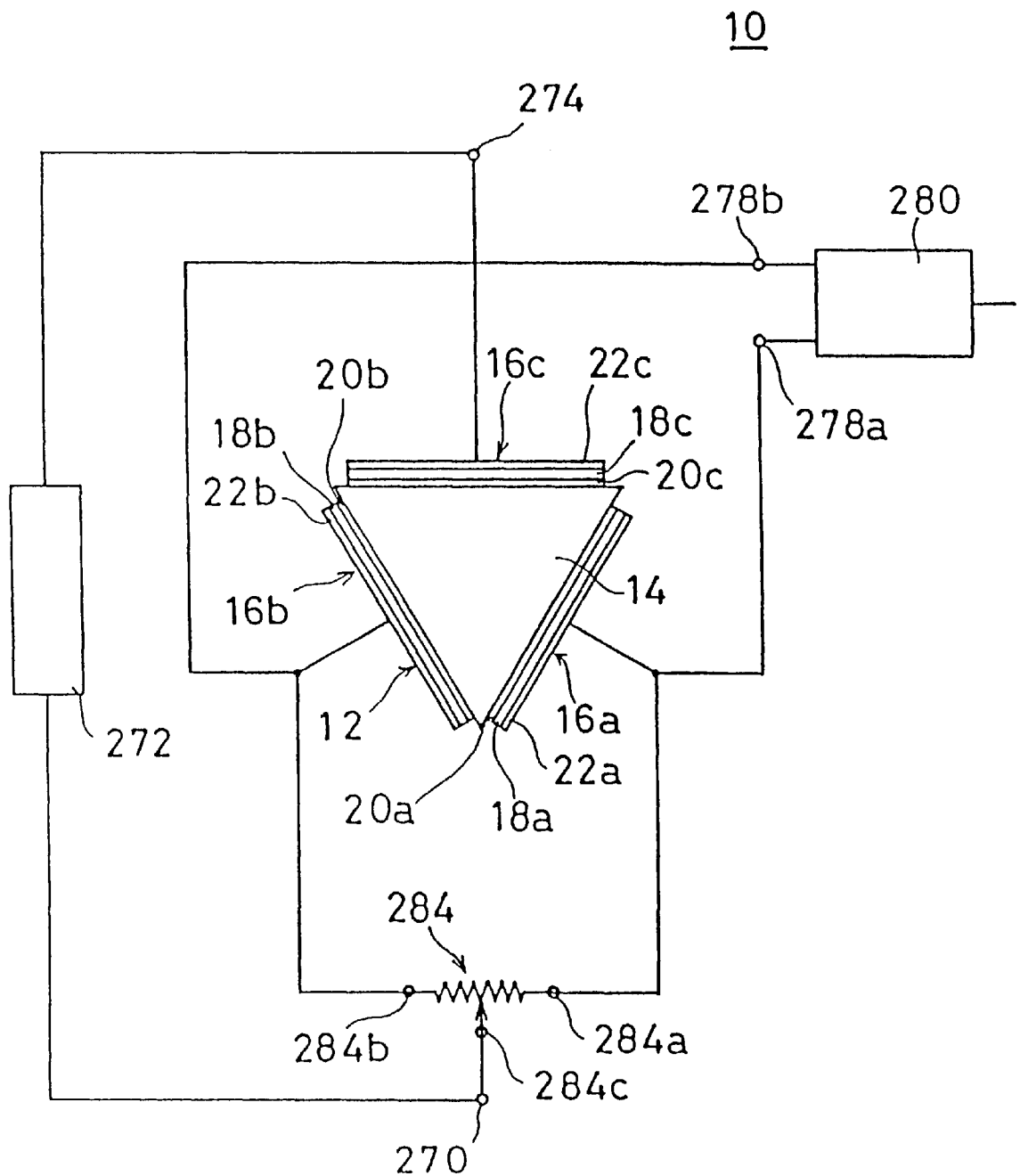

VIBRATOR INCLUDING PIEZOELECTRIC ELECTRODES OF DETECTORS ARRANGED TO BE NON-PARALLEL AND NON-PERPENDICULAR TO CORIOLIS FORCE DIRECTION AND VIBRATORY GYROSCOPE USING THE SAME

This is a Divisional of application Ser. No. 08/584,472 filed on Jan. 11, 1996, now U.S. Pat. No. 5,814,674, which is a Divisional of Ser. No. 08/263,894 filed on Jun. 22, 1994 now U.S. Pat. No. 5,505,085 which is a Divisional of Ser. No. 08/044,630 filed on Apr. 12, 1993 now U.S. Pat. No. 5,349,857 which is a Divisional of Ser. No. 07/835,087 filed on Feb. 18, 1992 now abandoned which is a Continuation of Ser. No. 07/525,821 filed on May 21, 1990, now abandoned, which is a Divisional of Ser. No. 07/391,825, filed Aug. 10, 1989, now abandoned.

BACKGROUND OF THE INVENTION

1. Field of the Invention

The present invention relates to a vibrator and a vibratory gyroscope using the same, more particularly, it relates to the vibratory gyroscope used, for example, in a navigation system installed on a motor vehicle and the vibrator which may be used therein.

2. Description of the Prior Art

FIG. 50 is an illustrative view showing one example of a conventional vibratory gyroscope comprising a background of the present invention, FIG. 51 is a perspective view showing a vibrator of the vibratory gyroscope and FIG. 52 is a sectional view taken along the line LII—LII of FIG. 51. The vibrator 2 of the vibratory gyroscope 1 includes a quadrangular prism shaped vibrating body 3 of a constant elastic metal material or the like.

On a pair of opposing surfaces of the vibrating body 3, detecting piezoelectric elements 4, 4 are formed respectively. As shown in FIG. 52, the detecting piezoelectric element 4 comprises electrodes 4b formed on both surfaces of a piezoelectric ceramic member 4a.

On a pair of side surfaces of the vibrating body 3 where the detecting piezoelectric element 4 is not formed, driving piezoelectric elements 5, 5 are formed respectively. The driving piezoelectric element 5 also comprises electrodes 5b on both surfaces of the piezoelectric ceramic member 5a similar to the detecting piezoelectric element 4. The vibratory gyroscope 1 is supported by supporting members 6, 6 extending through nodal points of the vibrating body 3.

A differential amplifier 7 is connected to the detecting piezoelectric element 4 of the vibrator 2, and an oscillator 8 is connected to the driving piezoelectric element 5. Thus, when the driving signal is supplied to the driving piezoelectric element 5, the vibrating body 3, as shown exaggeratively in FIG. 53, generates bending vibration in the direction perpendicular to the main surface of the driving piezoelectric element 5.

In such a state, if the vibratory gyroscope 1 is rotated, for example, about its axis, a Coriolis force is exerted in the direction perpendicular to the vibrating direction. Thus, as shown exaggeratively in FIG. 54, the vibrating direction of the vibrating body 3 is changed by the Coriolis force, and the output voltage is produced in the detecting piezoelectric element 4. Since the output voltage is proportional to a bending quantity in the direction perpendicular to the main surface of the detecting piezoelectric element 4, by measuring the output voltage, the rotational angular velocity of the vibratory gyroscope 1 can be determined. It is also the same even when the vibratory gyroscope 1 is rotated about any axis along its axis.

In such a conventional vibratory gyroscope, when the gyroscope is rotated, the bending direction of the vibrating body or the detecting piezoelectric element (a direction of a resultant vector of a bending vibration direction vector at non-rotation and a deviation vector by the Coriolis force) is in the direction deviating from the direction perpendicular to its main surface, so that the output voltage generated in the detecting piezoelectric element 5 was small. It was, therefore, difficult to measure the rotational angular velocity applied to the vibratory gyroscope from the output voltage. Accordingly, it was difficult to adjust the output voltage to zero, although required for determining the S/N ratio.

SUMMARY OF THE INVENTION

It is, therefore, a primary object of the present invention to provide a vibratory gyroscope in which the output voltage at rotation can be increased, such that the output voltage is not necessarily brought to zero at non-rotation, and to provide a vibrator used in such a vibratory gyroscope.

The vibrator according to the present invention comprises a vibrating body having a polygonal section and piezoelectric elements formed, at least, on two side surfaces of the vibrating body. The vibratory gyroscope according to the present invention utilizes the vibrator described above.

When a driving signal is applied to the piezoelectric element, the vibrating body produces bending vibration in the direction perpendicular to the main surface of the piezoelectric element.

When the vibratory gyroscope is rotated about its axis, though the vibrating direction is changed by a Coriolis force, side surfaces having the main surfaces in the direction substantially perpendicular to the vibrating direction are present on the vibrating body. Thus, when the piezoelectric element on this surface is used for detection, a large output voltage can be produced thereon.

According to the present invention, since the bending direction of the vibrating body and the main surfaces of the detecting piezoelectric elements are substantially at right angles relative to each other at rotation of the vibratory gyroscope, output voltages generated in the detecting piezoelectric elements are larger as compared with the prior art vibratory gyroscope. Accordingly, it is simple to detect the rotational angular velocity in this vibratory gyroscope. Thus, a delicate operation for determining the S/N ratio is not necessary.

The above and other objects, features and advantages of the present invention will become more apparent from the following detailed description of the embodiment taken in connection with the accompanying drawings.

BRIEF DESCRIPTION OF THE DRAWINGS

FIGS. 14(A)–14(D) and 15(A)–15(D) are graphs respectively showing outputs at respective portions of the circuit of FIG. 13, wherein FIGS. 14(A)–14(D) shows the output at non-rotation of the vibratory gyroscope and FIGS. 15(A)–15(D) shows the output at rotation thereof.

FIG. 17 is a sectional view showing a modified example of the embodiment of FIGS. 11 and 12.

FIGS. 31 and 32 respectively show the state of output voltages of the vibratory gyroscope shown in FIGS. 28 and 29, wherein FIG. 31 is an illustrative view at non-rotation and FIG. 32 is an illustrative view at rotation.

FIG. 45 is an illustrative view showing a modified embodiment of FIG. 44.

DESCRIPTION OF THE PREFERRED EMBODIMENTS

Figure 1:
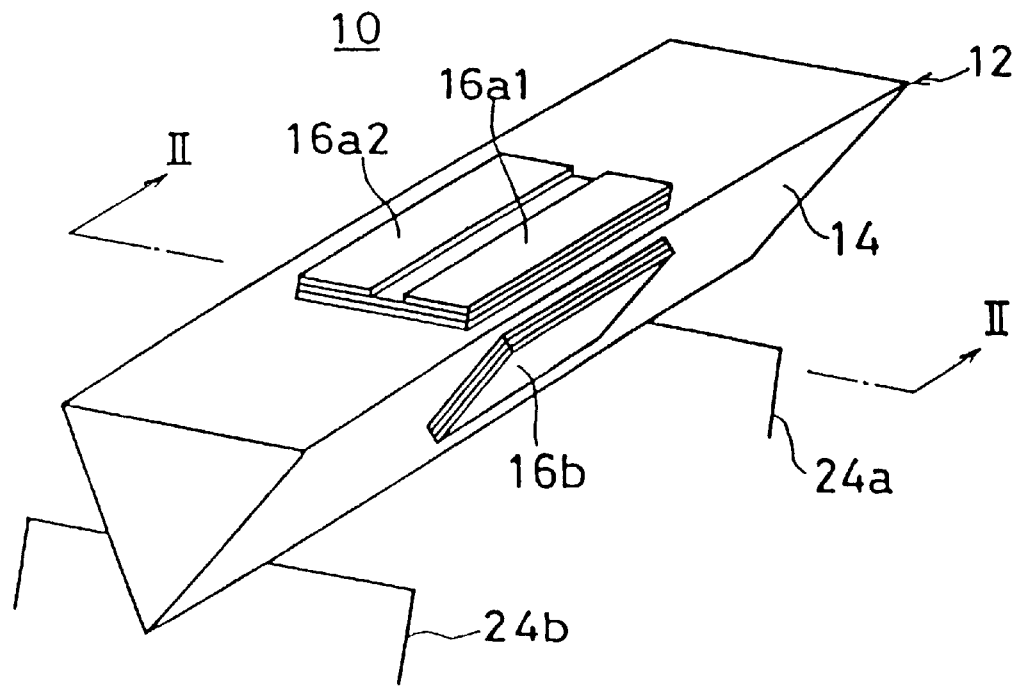
FIG. 1 is a perspective view showing one embodiment of the present invention.
Figure 2:
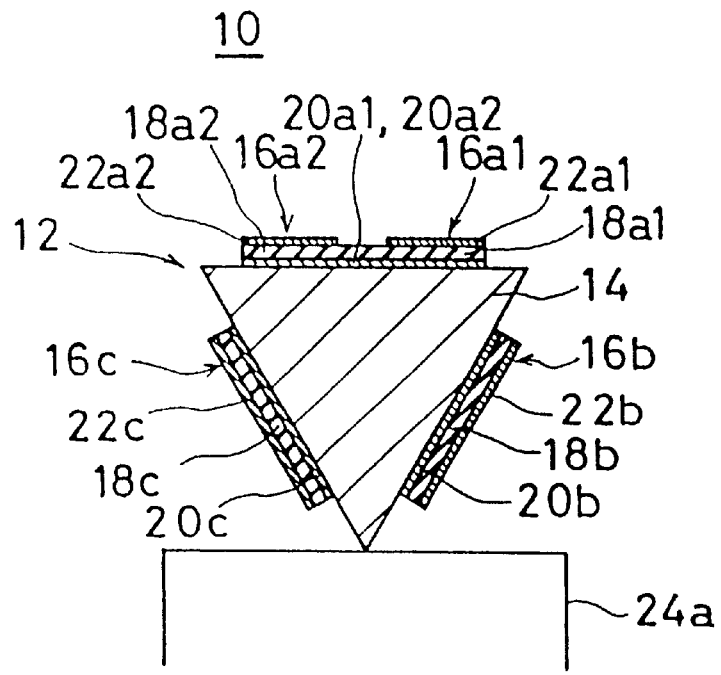
FIG. 2 is a sectional view taken along the line II—II of FIG. 1.

FIG. 1 is a perspective view showing one embodiment of the present invention, and FIG. 2 is a sectional view taken along the line II—II of FIG. 1. A vibratory gyroscope 10 comprises a vibrator 12, which includes, for example, a regular triangular prism shaped vibrating body 14. The vibrating body 14 is made of a constant elastic metal material such as Ni, Fe, Cr and Ti alloys.

In the embodiment, on one side surface of the vibrating body 14, two driving piezoelectric elements 16a1 and 16a2 are formed in the longitudinal center. The piezoelectric elements 16a1 and 16a2 are formed in parallel laterally of the side surface of the vibrating body 14.

As shown in FIG. 2, one piezoelectric element 16a1 includes a piezoelectric layer 18a1 consisting, for example, of ceramic, and on both surfaces of the piezoelectric layer 18a1, electrodes 20a1 and 22a1 are formed respectively. One electrode 20a1 is bonded to the vibrating body 14.

Similarly, the other piezoelectric element 16a2 also includes a piezoelectric layer 18a2, on both surfaces of which, electrodes 20a2 and 22a2 are formed. One electrode 20a2 is bonded to the vibrating body 14. In the embodiment, the piezoelectric layers 18a1 and 18a2 are formed integrally, and the electrodes 20a1 and 20a2 bonded to the vibrating body 14 are also formed integrally.

In the embodiment, for practical reasons, in the center of the remaining two side surfaces of the vibrating body 14, detecting piezoelectric elements 16b and 16c are formed respectively.

One detecting piezoelectric element 16b, as shown in FIG. 2, comprises a piezoelectric layer 18b provided with electrodes 20b and 22b on both surfaces thereof. One electrode 20b is bonded to the side surface of the vibrating body 14.

Similarly, the other detecting piezoelectric element 16c also comprises a piezoelectric layer 18c provided with electrodes 20c and 22c on both surfaces thereof. One electrode 20c is bonded to the vibrating body 14.

Accordingly, in the embodiment, the driving piezoelectric elements 16a1 and 16a2 are formed on the side surfaces of the vibrating body 14 where the detecting piezoelectric elements 16b and 16c are not formed.

Figure 3:
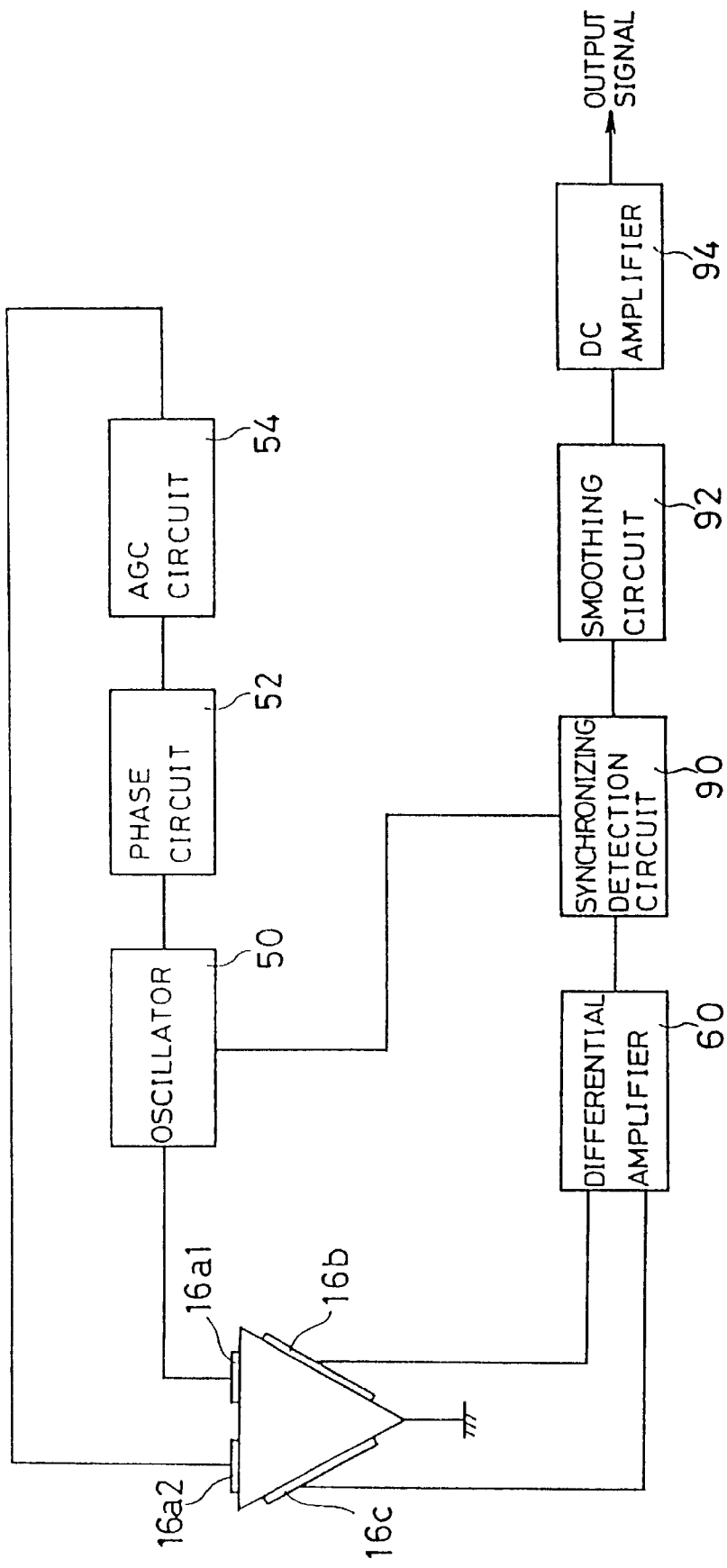
FIG. 3 is a block diagram showing a circuit for using a vibratory gyroscope shown in FIGS. 1 and 2.

Though the vibrating body 14 makes bending vibration by applying the driving signal between the driving piezoelectric elements 16a1 and 16a2, supporting members 24a and 24b are secured to its nodal point. The supporting members 24a and 24b are secured by welding, for example, a metal wire and the like to the vibrating body 14. The vibratory gyroscope 10 is used in a circuit configuration as shown in FIG. 3.

That is, the input side of an oscillator 50 is connected to one driving piezoelectric element 16a1 of the vibratory gyroscope 10, and the output side thereof is connected to the other driving piezoelectric element 16a2 via a phase circuit 52 and an AGC circuit 54. Thus, the signal amplified in the oscillator 50 is phase controlled in the phase circuit 52 and applied to the driving piezoelectric element 16a2 after being gain controlled in the AGC circuit 54. Then, the stable driving signal provided at resonance frequencies of the vibrator 14 is applied to the vibratory gyroscope 10 by the oscillator 50, the phase circuit 52 and the AGC circuit 54.

The detecting piezoelectric elements 16b and 16c are connected to the input side of the differential amplifier 60, through which the output voltage difference between the detecting piezoelectric elements 16b and 16c is measured. The differential amplifier 60 is connected to a synchronizing detection circuit 90, which is connected to the oscillator 50 to detect the output of the differential amplifier 60 in synchronism with the vibration frequencies of the oscillator 50. The signal detected by the synchronizing detection circuit 90 is smoothed by a smoothing circuit 92, and further amplified to the output signal by a DC amplifier 94.

Figure 4:
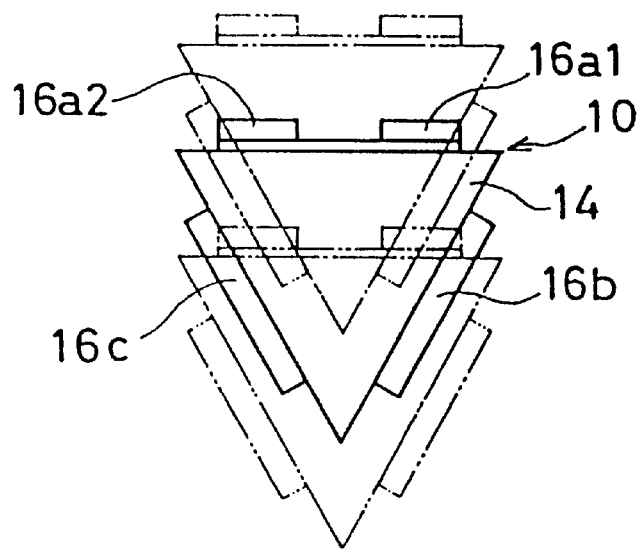
FIG. 4 is an illustrative view showing the vibration when the vibratory gyroscope shown in FIGS. 1 and 2 is not rotating.

When the vibratory gyroscope 10 is not rotated, as shown exaggeratively in FIG. 4, it makes bending vibration in the direction perpendicular to the main surfaces of the driving piezoelectric elements 16a1 and 16a2. In this case, since bending quantities of the surfaces of the vibrating body 14 provided with the detecting piezoelectric elements 16b and 16c are the same, the output voltages generated in the detecting piezoelectric elements 16b and 16c are equal. Thus, the output voltages of the detecting piezoelectric elements 16b and 16c cancel each other in the differential amplifier 60 and the output becomes zero. That is, in the vibratory gyroscope 10, the output at nonrotation can be simply brought to zero.

Figure 5:
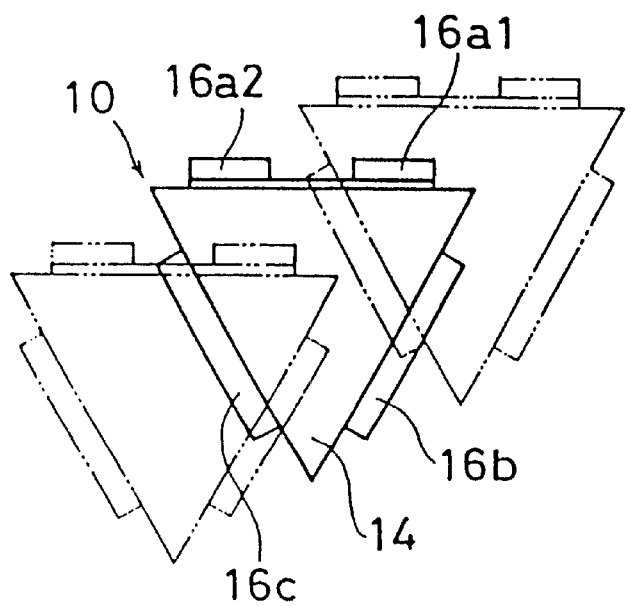
FIG. 5 is an illustrative view showing the vibration when the vibratory gyroscope shown in FIGS. 1 and 2 is rotating.

Furthermore, when the vibratory gyroscope 10 is rotated about its axis, a Coriolis force is exerted in the direction perpendicular to the vibrating direction of the vibrating body 14. In this case, as shown exaggeratively in FIG. 5, the vibrating direction of the vibrating body 14 deviates from the vibrating direction at non-rotation. At this time, for example, the detecting piezoelectric element 16c produces a bending motion in a direction nearly perpendicular to its main surface, and the detecting piezoelectric element 16b produces a bending motion in a direction nearly parallel to its main surface. Therefore, the output voltage generated in the detecting piezoelectric element 16c increases, and the output voltage generated in the detecting piezoelectric element 16b decreases. Accordingly, a larger output can be obtained from the differential amplifier 60 as compared with the conventional vibratory gyroscope. Thus, when this vibratory gyroscope 10 is used, the rotational angular velocity is more easily detected than when using the conventional vibratory gyroscope.

In the embodiment described above, though the output voltage difference between the two detecting piezoelectric elements 16b and 16c was measured, either of the two output voltages may be measured to detect the rotational angular velocity.

Also, in the aforesaid embodiment, though the vibrating body 14 is formed into a regular triangular prism, it may be formed into an isosceles triangular prism. In this case, the detecting piezoelectric elements 16b and 16c may be formed on each side surface of the vibrating body 14 having the same area.

Moreover, the vibrating body 14 may be formed into a triangular prism other than the isosceles triangular prism, or into polygonal prisms such as pentagonal or hexagonal prisms. In this case, the detecting piezoelectric element may be formed, at least, on one side surface of the vibrating body where the driving piezoelectric element is not formed.

Figure 6:
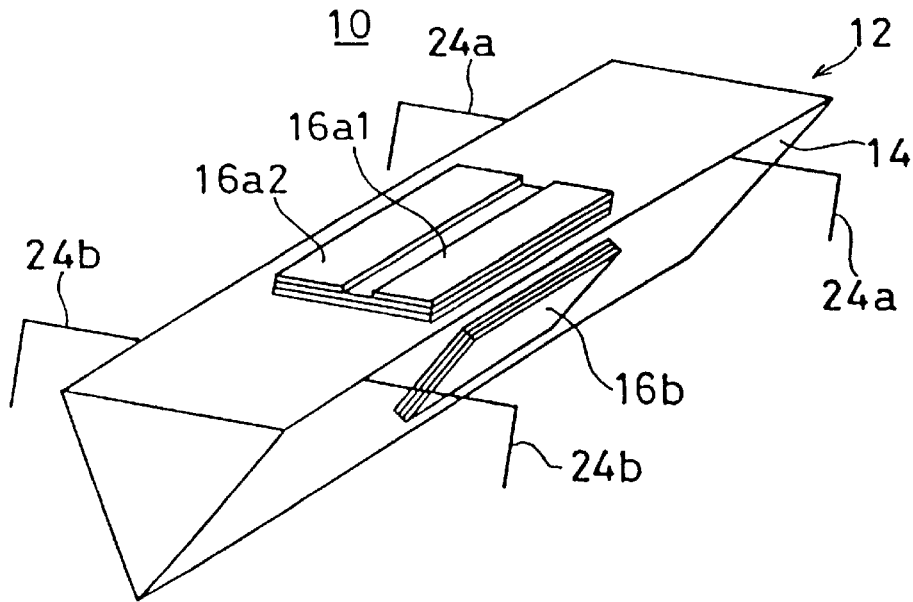
FIG. 6 is a perspective view showing a modified example of the embodiment shown in FIGS. 1 and 2.

In the embodiment described above, though the supporting members 24a and 24b are connected respectively to the vibrating body 14 at one point, as shown in FIG. 6, they may be connected respectively at two points. That is, the supporting members 24a and 24b may be connected to only the nodal points of the vibrating body 14.

Figure 7:
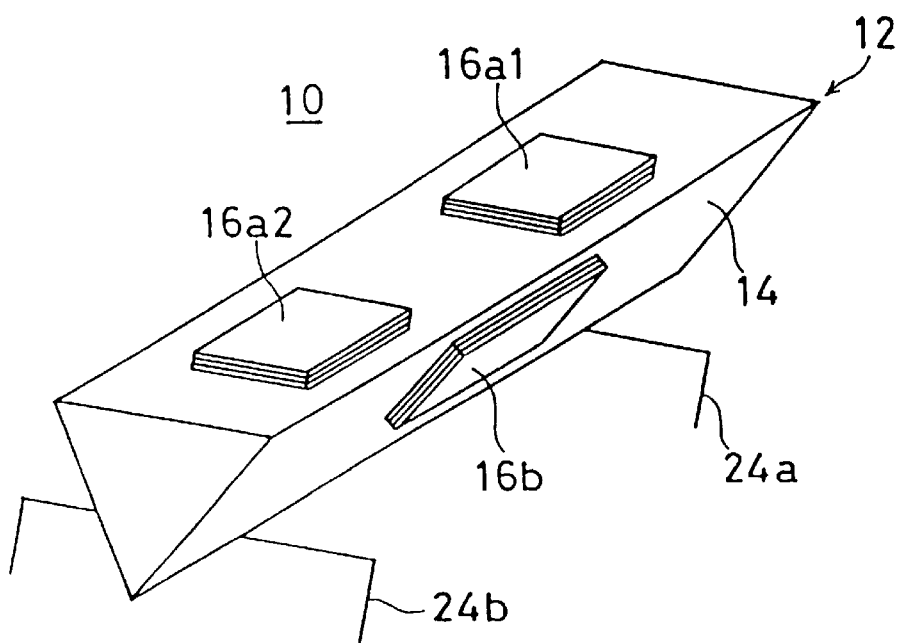
FIG. 7 is a perspective view showing another modified example of the embodiment shown in FIGS. 1 and 2.

Furthermore, as shown in FIG. 7, the driving piezoelectric elements 16a1 and 16a2 may be formed at a distance along the length of the vibrating body 14.

Figure 8:
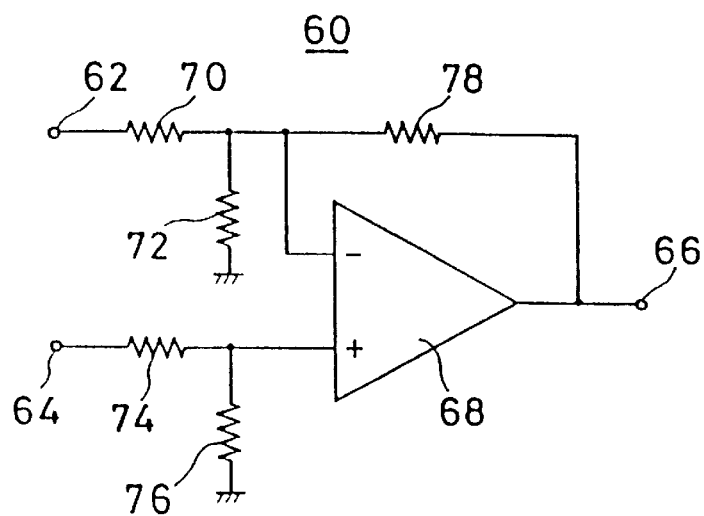
FIG. 8 is a circuit diagram showing a differential amplifier used in a vibratory gyroscope of the present invention.

FIG. 8 is a circuit diagram showing an example of the differential amplifier 60 shown in FIG. 3. The differential amplifier 60 includes two input ends 62, 64 and one output end 66. The differential amplifier 60 also includes an operational amplifier 68. One input end 62 is connected to an inversion input terminal of the operational amplifier 68 via a resistance 70. The inversion input terminal of the operational amplifier 68 is grounded via a resistance 72.

The other input end 64 of the differential amplifier 60 is connected to a non-inversion input terminal of the operational amplifier 68 via a resistance 74. The non-inversion input terminal of the operational amplifier 68 is grounded via a resistance 76. Ratio R2/R1 of the resistance values R1 and R2 of the two resistances 74 and 76 connected to the non-inversion input terminal of the operational amplifier 68 is set to become generally equal to the ratio R4/R3 of the resistance values R3 and R4 of the two resistances 70 and 72 connected to the inversion input terminal of the operational amplifier 68.

An output terminal of the operational amplifier 68 is connected to the output end 66 of the differential amplifier 60, and the output terminal and inversion input terminal of the operational amplifier 68 are connected via a resistance 78.

In such a differential amplifier 60, its amplification is represented by the ratio R5/R3 of the resistance values R3 and R5 of the resistance 70 between the input end 62 and inversion input terminal of the operational amplifier 68, and the resistance 78 between the inversion input terminal and the output terminal of the operational amplifier 68. Thus, when the input voltage V1 is applied to the input end 62 and the input voltage V2 is applied to the input end 64, the output voltage V generated at the output end 66 is represented as follows:

V=(V1–V2) R5/R3

Figure 9:
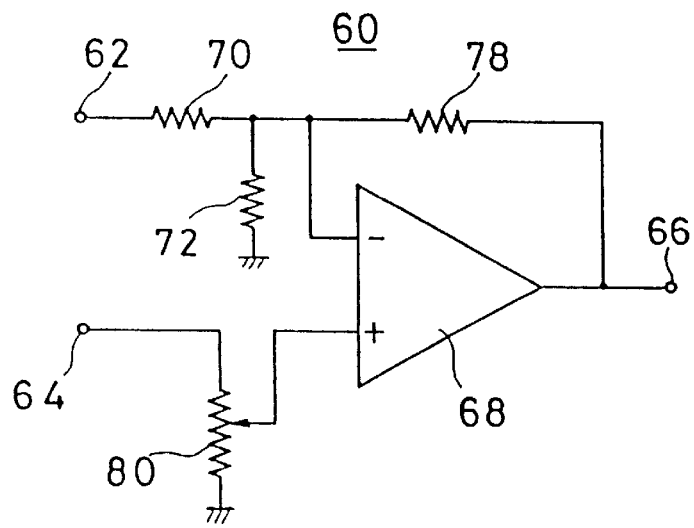
FIG. 9 is a circuit diagram showing an example enabling the gain control in the differential amplifier of FIG. 8.

In such a differential amplifier 60, in order to control gains on the non-inversion input side, as shown, for example, in FIG. 9, a variable resistance 80 is connected to the non-inversion input terminal of the operational amplifier 68. In this case, one fixed terminal of the variable resistance 80 is connected to the input end 64 and the other fixed terminal thereof is grounded. Then, a movable terminal of the variable resistance 80 is connected to the non-inversion input terminal of the operational amplifier 68.

In order to obtain, for example, the amplification of ten times by using such a differential amplifier 60, for example, the resistance values R3 and R4 of the resistances 70 and 72 connected to the inversion input terminal of the operational amplifier 68 are set respectively at 1 kΩ, and the resistance value R5 of the resistance 78 is set at 10 kΩ,. The resistance value between the two fixed terminals of the variable resistance 80 is set, for example, at 2 kΩ. In such a case, since the resistance values R3 and R4 of the resistances 70 and 72 connected to the inversion input terminal of the operational amplifier 68 are set respectively at 1 kΩ, the movable terminal of the variable resistance 80 is controlled substantially near the center between the two fixed terminals. That is, the movable terminal of the variable resistance 80 is controlled in the proximity of 1 kΩ from the two fixed terminals.

In the conventional differential amplifier without the resistance 72, though the proximity of one end of the variable resistance 80 had to be controlled for gain control, in the differential amplifier 60 shown in FIG. 9, the gain control is very simple since it can be effected substantially near the center of the variable resistance 80.

In the prior art differential amplifier, in order to enable the gain control near the center of the variable resistance, a fixed resistance was connected to the variable resistance in series. In such a case, since the resistance temperature coefficients of the variable resistance and fixed resistance are unequal, a drift is produced by atmospheric temperature. On the contrary, in the differential amplifier 60 shown in FIG. 9, the fixed resistance is not needed to be connected to the variable resistance 80, thus a drift is hardly produced by atmospheric temperature.

That is, in this differential amplifier, the inversion input terminal of the operational amplifier is grounded via a resistance.

Therefore, the ratio of the resistance between the input end of the differential amplifier and the inversion input terminal of the operational amplifier, and the resistance between the inversion input terminal of the operational amplifier and ground, and the ratio of the resistance between the input end and the non-inversion input terminal of the operational amplifier, and the resistance between the non-inversion input terminal of the operational amplifier and ground are set substantially equally.

Accordingly, by suitably selecting the ratio of the resistance between the input end of the differential amplifier and the inversion input terminal of the operational amplifier, and the resistance between the input terminal of the, operational amplifier and ground, the ratio of the resistance between the input end and the non-inversion input terminal of the operational amplifier, and the resistance between the non-inversion input terminal of the operational amplifier and ground can be changed optionally. Thus, if a variable resistance is connected to the input terminal of the operational amplifier for gain control on the non-inversion input side of the differential amplifier, it can be controlled near the center of the variable resistance and a fixed resistance is not needed to be connected to the variable resistance. Therefore, the gain control on the non-inversion input side of the differential amplifier can be simply accomplished and a drift due to atmospheric temperature hardly occurs.

In the differential amplifier 60 described above, though the resistance values of the resistances 70 and 72 are made equally to control near the center of the variable resistance 80, if the resistance value ratio of the resistances 70 and 72 is set at 1:2, the movable terminal of the variable resistance 80 can also be controlled at the position between the two fixed terminal into 1:2 responsive thereto. Thus, by suitably selecting the resistance value of the resistance connected to the operational amplifier 68, the gain control can be effected at any position of the variable resistance 80. In this differential amplifier 60, the resistance value R3 of the resistance 70 connected to the inversion input terminal of the operational amplifier 68, and the resistance values R1 and R2 of the resistances 74 and 76 connected to the non-inversion input terminal can be set freely, and even when the both input terminal impedances have to be made equally, it can be easily set.

Figure 10:
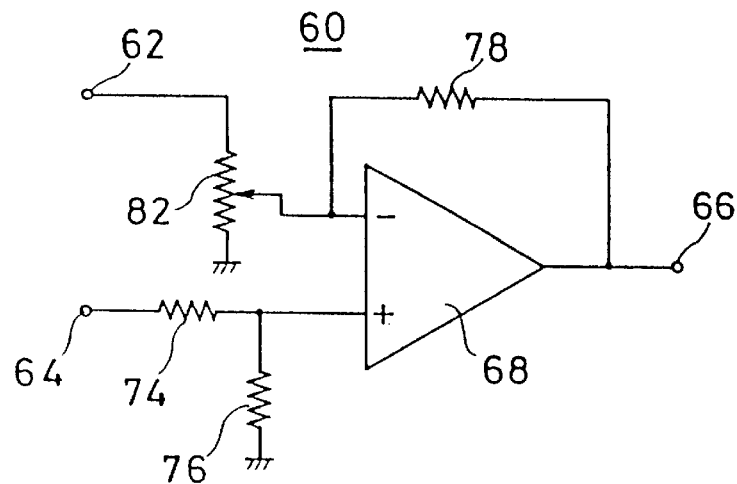
FIG. 10 is a circuit diagram showing a modified example of the differential amplifier of FIG. 9.

In the aforesaid differential amplifier 60, though the variable resistance 80, was connected to the non-inversion input terminal of the operational amplifier 68, as shown in FIG. 10, the variable resistance 82 may be connected to the inversion input terminal of the operational amplifier 68 for gain control. Moreover, it is also possible to control the gain by connecting the variable resistance to both of the inversion input terminal and non-inversion input terminal of the operational amplifier 68.

Figure 11:
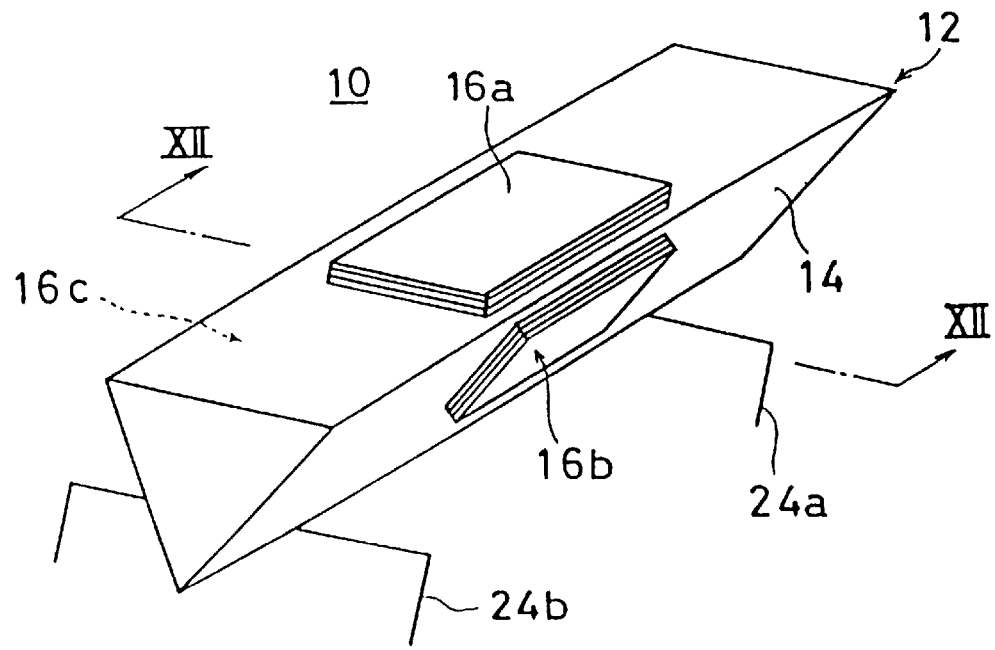
FIG. 11 is a perspective view showing another embodiment of the present invention.
Figure 12:
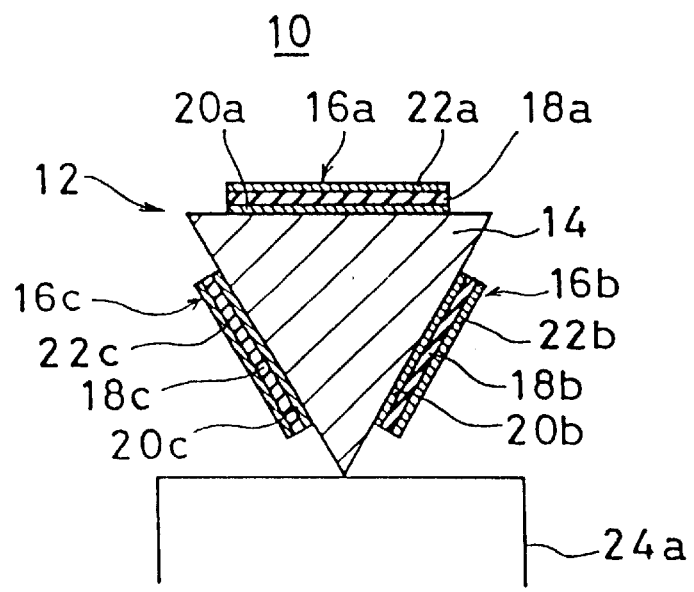
FIG. 12 is a sectional view taken along the line XII—XII of FIG. 11.

FIG. 11 is a perspective view showing another embodiment of the present invention, and FIG. 12 is a sectional view taken along the line XII—XII of FIG. 11.

A vibrator 12 of a vibratory gyroscope 10 of the embodiment includes, for example, a regular triangular prism shaped vibrating body 14. The vibrating body 14 is formed with a material producing, in general, a mechanical vibration such as elinver, ferro-nickel alloy, quartz, glass, crystal, ceramic etc.

On the vibrating body 14, in the center of three side surfaces thereof, piezoelectric elements 16a, 16b and 16c are formed respectively. The piezoelectric element 16a includes a piezoelectric layer 18a consisting, for example, of ceramic, and on two main surfaces thereof, electrodes 20a and 22a are formed respectively. The electrodes 20a and 22a are made of an electrode material such as gold, silver, aluminum, nickel, copper-nickel alloy(Monel Metal) etc., and formed by thin film techniques such as sputtering and evaporation or depending upon the material, by printing techniques. Similarly, the other piezoelectric elements 16b and 16c include respectively piezoelectric layers 18b and 18c consisting of, for example, ceramic, and on both surfaces thereof, there are respectively, formed electrodes 20b, 22b and 20c, 22c. The electrodes 20a–20c of the piezoelectric elements 16a–16c are bonded to the vibrating body 14, for example, by conductive adhesives.

The vibrating body 14 is supported by supporting members 24a and 24b consisting of a metal wire in the proximity of the nodal points of the vibrating body 14. The supporting members 24a and 24b are secured near the nodal points of the vibrating body 14, for example, by welding. The supporting members 24a and 24b may also be secured by a conductive paste. The supporting members 24a and 24b are used as a grounding terminal of the vibratory gyroscope 10.

In the vibratory gyroscope 10, if any one of the piezoelectric elements 16a–16c is used for driving, the remaining two piezoelectric elements may be used for detection. In this embodiment, for example, the piezoelectric element 16a is used for driving and the other piezoelectric elements 16b and 16c are used for detection. When the driving signal is given to the driving piezoelectric element 16a, the vibrating body 14 is vibrated and similar sine waves are output from the detecting piezoelectric elements 16b and 16c. When the vibratory gyroscope 10 is rotated about its axis under this condition, the output of one detecting piezoelectric element increases in accordance with the rotational angular velocity, and conversely, the output of the other detecting piezoelectric element decreases.

Figure 13:
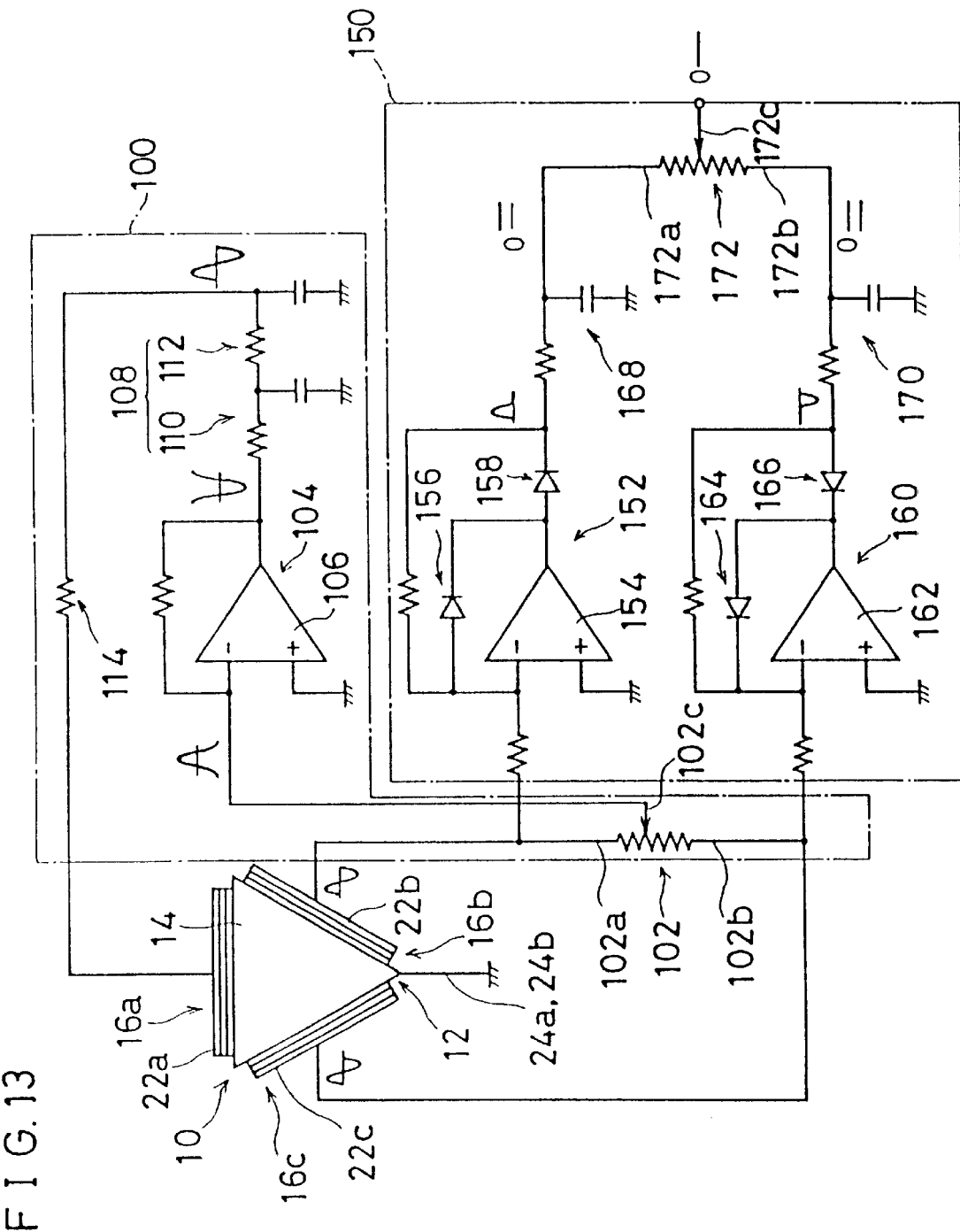
FIG. 13 is a circuit diagram showing an example of gyroscope apparatus using the vibratory gyroscope shown in FIGS. 11 and 12.

Referring now to FIG. 13, between the detecting piezoelectric elements 16b, 16c and the driving piezoelectric element 16a of the vibratory gyroscope 10, an oscillator 100 is connected as a feedback loop for self-oscillation driving of the vibratory gyroscope 10.

That is, the oscillator 100 is designed to apply the outputs of the detecting piezoelectric elements 16b and 16c to the driving piezoelectric element 16a in composite form, and includes a variable resistance 102 having two fixed terminals 102a and 102b as input ends. The fixed terminals 102a and 102b of the variable resistance 102 are connected respectively to the electrodes 22b and 22c of the 11 piezoelectric elements 16b and 16c. The variable resistance 102 is designed to correct voltage errors and phase difference produced between the outputs from the piezoelectric elements 16b and 16c, and to provide those outputs. In place of the variable resistance 102, these outputs may be provided by two fixed resistances.

Furthermore, a movable terminal 102c of the variable resistance 102 is connected to an input side of an inversion amplifier 104. The inversion amplifier 104 includes an operational amplifier 106, and is designed to invert the output phase from the variable resistance 102 and to amplify its signal.

An output side of the inversion amplifier 104 is connected to an input side of a low-pass filter 108 which includes two-stage RC filters 110 and 112. Each of the RC filters 110 and 112 has, for example, a lagging power factor of 45 degrees. The low-pass filter 108 is for lagging the output phase from the inversion amplifier 104 by 90 degrees and suppressing harmonic components included in the output. An output side of the low-pass filter 108 is connected to the electrode 22a of the driving piezoelectric element 16a via a resistance 114.

Meanwhile, the outputs of the piezoelectric elements 16b and 16c of the vibratory gyroscope 10 are inputted respectively to two input ends of a differential amplifier 150 for detecting the output difference thereof.

That is, the differential amplifier 150 includes an ideal diode circuit 152, to an output side of which, the electrode 22b of one detecting piezoelectric element 16b is connected. The ideal diode circuit 152 includes one operational amplifier 154 and two diodes 156 and 158 interconnected in a forward direction for half-wave rectification of the sine-wave output from the piezoelectric element 16b into the positive signal.

The electrode 22c of the other detecting piezoelectric element 16c is connected to an input side of another ideal diode circuit 160 having a polarity which is different from the aforesaid ideal diode circuit 152. The ideal diode circuit 160 includes one operational amplifier 162 and two diodes 164 and 166 interconnected reversely for half-wave rectification of the sine-wave output from the piezoelectric element 16c into a negative signal.

Output sides of the ideal diode circuits 152 and 160 are connected respectively to input sides of smoothing circuits 168 and 170 comprising, for example, RC filters. Output sides of the smoothing circuits 168 and 170 are connected respectively to fixed terminals 172a and 172b of a variable resistance 172 which function as a composing means. The variable resistance 172 includes a movable terminal 172c.

In the following, the operation of respective circuits at non-rotation and at rotation of the vibratory gyroscope 10 will be described with reference to FIGS. 13, 14 and 15. In FIG. 13, output wave forms of respective portions at non-rotation of the vibratory gyroscope 10 are shown together with the circuits. In FIGS. 14(A)–14(D), outputs of the detecting piezoelectric elements 16b and 16c, an output of the variable resistance 102 of the oscillator 100 and an output of the differential amplifier 150 at non-rotation of the vibratory gyroscope 10 are shown, and in FIGS. 15(A)–15(D), these outputs at rotation of the vibratory gyroscope 10 in one direction are shown. In this case, in FIGS. 14(A)–14(D) and FIGS. 15(A)–15(D), magnitudes and wave forms of those outputs are shown more or less correctly, but those phases are shown incorrectly.

At non-rotation of the vibratory gyroscope 10, the gyroscope 10 produces bending vibration in the direction perpendicular to the main surface of the driving piezoelectric element 16a, so that the piezoelectric elements 16b and 16c bend similarly. Therefore, from the piezoelectric elements 16b and 16c, as particularly shown in FIGS. 14(A)–14(D), the similar sine waves are output.

In the oscillator 100, the outputs from the piezoelectric elements 16b and 16c are output from the movable terminal 102c of the variable resistance 102 in composite form. In this case, the composite output of the piezoelectric elements 16b and 16c shows a predetermined sine wave having the phase of −90° based on a driving side of the vibratory gyroscope 10 in an ideal state. However, when the voltage errors and phase differences are produced between the outputs of the piezoelectric elements 16b and 16c, a predetermined sine wave described above can not be obtained by merely combining the outputs of the piezoelectric elements 16b and 16c.

However, the voltage errors and phase differences between the outputs of the piezoelectric elements 16b and 16c can be corrected by controlling the variable resistance 102. Thus, by controlling the variable resistance 102, the output from the movable terminal 102c can be corrected into a predetermined sine wave having the phase of −90° based on the driving side.

In the inversion amplifier 104, the sine-wave output phase from the variable resistance 102 is inverted and its signal is amplified. Thus, from the inversion amplifier 104, a signal having the phase of 90° based on the driving side of the vibratory gyroscope 10 is output.

In the low-pass filter 108, the output phase from the inversion amplifier 104 is lagged by 90° and harmonic wave components included in the output are suppressed. Thus, from the low-pass filter 108, a constant signal having no spurious due to the harmonic wave components is output always in the same phase as the driving side of the vibratory gyroscope 10.

The output from the low-pass filter 108 is applied to the electrode 22a of the driving piezoelectric element 16a via the coupling resistance 114. Thus, in this embodiment, the self-oscillation drive of the vibratory gyroscope 10 can be accomplished efficiently.

In the differential amplifier 150, a halfwave rectification of the sine-wave output of the piezoelectric element 16b is effected in a forward direction by the ideal diode circuit 152. Therefore, a positive sinewave output signal from the piezoelectric element 16b is output from the ideal diode circuit 152.

Also, a half-wave rectification of the sine-wave output from the piezoelectric element 16c is effected reversely by the other ideal diode circuit 160, and its negative sine-wave output signal is output.

By the smoothing circuits 168 and 170, the outputs from the ideal diode circuits 152 and 160 are smoothed into the positive and negative direct currents.

These DC outputs are supplied to the fixed terminals 172a and 172b of the variable resistance 172 as a composing means. Thus, from the movable terminal 172c of the variable resistance 172, the DC outputs from the smoothing circuits 168 and 170 are output in composite form.

In the differential amplifier 150, the output of the piezoelectric element 16b is smoothed by half-wave rectification in a forward direction, and the output of the piezoelectric element 16c is smoothed by half-wave rectification in an opposite direction before composition, so that even if the phase difference exists between these outputs, errors due to the phase difference will not occur.

Even if the voltage errors exist between these outputs, by controlling the variable resistance 172 as a composite means, these voltage errors may be corrected. In this embodiment, the output of the differential amplifier. 150 at non-rotation of the vibratory gyroscope 10 is controlled to become zero. Thus, if it is confined that the output from the differential amplifier 150 is zero, it is known that the vibratory gyroscope 10 is not rotating.

When the vibratory gyroscope 10 is rotated in one direction about its axis, a Coriolis force is exerted in the direction perpendicular to its vibrating direction. Therefore, the vibrating direction of the vibratory gyroscope 10 is deviated from the vibrating direction at non-rotation. At this time, for example, one detecting piezoelectric element 16b produces bending vibration in the direction substantially perpendicular to its main surface, and the other detecting piezoelectric element 16c produces bending vibration in the direction substantially parallel to its main surface.

In this case, as particularly shown in FIGS. 15(A)–15(D), the output from one detecting piezoelectric element 16b increases, and conversely the output from the other detecting piezoelectric element 16c decreases by the output increment of the piezoelectric element 16b. Thus, also in this case, the output from the variable resistance 102 of the oscillator 100 becomes the same as the output at non-rotation.

The output from the variable resistance 102 is, as in the case of non-rotation, supplied to the driving piezoelectric element 16a via the inversion amplifier 104, the low-pass filter 108 and so on. Thus, also at rotation of the vibratory gyroscope 10, as with non-rotation, self-oscillation drive of the vibratory gyroscope 10 can be accomplished efficiently.

On the other hand, in the differential amplifier 150, since the output of the piezoelectric element 16b becomes larger than that of the piezoelectric element 16c, the absolute output value of the smoothing circuit 168 becomes larger than that of the other smoothing circuit 170. Thus, as shown in FIGS. 15(A)–15(D), the positive direct current is output from the variable resistance 172 as a composite means, thereby it is known that the vibratory gyroscope 10 is rotating in one direction.

Since the output difference between the piezoelectric elements 16b and 16c becomes larger as the rotational angular velocity of the vibratory gyroscope 10 increases, the output from the differential amplifier 150 also increases. Thus, from the magnitude of the output from the differential amplifier 150, the rotational angular velocity of the vibratory gyroscope 10 can be determined. Also in this case, in the differential amplifier 150, the output of the piezoelectric element 16b is smoothed by half-wave rectification in a forward direction, and the output of the piezoelectric element 16c is smoothed by half-wave rectification in an opposite direction before composition, so that even if the phase difference exists between these outputs, errors due to the phase difference will not occur.

When the vibratory gyroscope 10 is rotating reversely, since the outputs of the piezoelectric elements 16b and 16c are reversed, the negative direct current is output from the differential amplifier 150. Thus, by the output polarity from the differential amplifier 150, the rotating direction of the vibratory gyroscope 10 can be determined.

Figure 16:
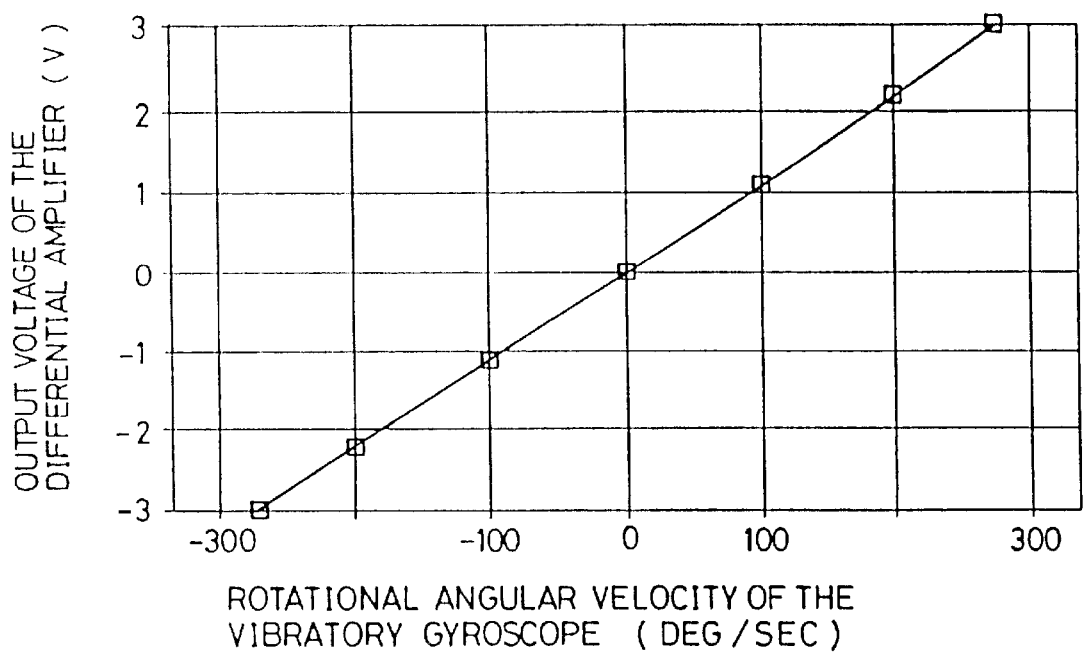
FIG. 16 is a graph showing the relationship between the rotational angular velocity of the vibratory gyroscope and the output voltage of a differential amplifier in a circuit of FIG. 13.

According to experiments made by the inventor, in this embodiment, the rotational angular velocity of the vibratory gyroscope 10 and the output voltage of the differential amplifier 150, as shown in FIG. 16, have an accurate linear relationship, and have a high S/N ratio.

In the embodiment described above, for self-oscillation drive of the vibratory gyroscope 10, though, the outputs of the two detecting piezoelectric elements 16b and 16c are supplied to the driving piezoelectric element 16a in the composite form by the special oscillator 100, in place thereof, these outputs may be supplied to the driving piezoelectric element in the composite form by a usual summing amplifier. In short, for self-oscillation drive of the vibratory gyroscope 10, the outputs of the two detecting piezoelectric elements may be supplied to the driving piezoelectric element in the composite form.

In the embodiment described above, though the output difference of the two detecting piezoelectric elements 16b and 16c was detected by the special differential amplifier 150 for measuring the rotational angular velocity of the vibratory gyroscope 10, in lieu of the special differential amplifier 150, a usual differential amplifier may be used to detect the output difference. In this case, the output difference is obtained in a sine wave. In short, in order to measure the rotational angular velocity of the vibratory gyroscope 10, the output difference of the two detecting piezoelectric elements may be detected.

In the aforesaid oscillator 100, though the fixed terminals 102a and 102b of the variable resistance 102 are used as input ends, and the movable terminal 102c thereof is connected directly to the input side of the inversion amplifier 104, the input ends and the fixed terminals 102a, 102b of the variable resistance 102, and the movable terminal 102c thereof and the input side of the inversion amplifier 104 may be connected respectively via resistances.

In short, the oscillator may consist of two input ends, and include a resistance connected between the two input ends and an amplifier whose input side is connected to the midway of the resistance. When the two input ends of such an oscillator are connected respectively to two detecting piezoelectric elements of a vibrator of a vibratory gyroscope, and an output end of the oscillator is connected to a driving piezoelectric element of the vibrator, outputs from the two detecting piezoelectric elements are supplied to the driving piezoelectric element in the composite form. In this case, by adjusting the connecting point between the input side of the amplifier of the oscillator and the midway of the resistance, voltage errors and phase differences produced between the outputs of the two detecting piezoelectric elements can be corrected. Therefore, an optimum driving signal is applied to the driving piezoelectric element of the vibrator. Thus, self-oscillation drive of the vibrator can be accomplished efficiently.

FIG. 17 is a sectional view showing the modified embodiment of FIGS. 11 and 12. In the vibratory gyroscope 10 of the embodiment, in particular, a vibrating body 14 is formed with a vibration material consisting of a metal such as elinver, ferro-nickel alloy etc. On three side faces of the vibrating body 14, piezoelectric layers 18a–18c of piezoelectric elements 16a–16c are formed with a piezoelectric material such as PZT and ZnO by thin-film techniques such as sputtering and evaporation. Thus, between these piezoelectric layers 18a–18c and the vibrating body 14, electrodes 20a–20c in the embodiment shown in FIGS. 11 and 12 are not formed. This is because the vibrating body 14 serves as the electrodes 20a–20c.

Meanwhile, on the surfaces of the piezoelectric layers 18a–18c, electrodes 22a–22c are formed with an electrode material such as gold, silver, aluminum, nickel, copper-nickel alloy (Monel Metal) etc. by thin-film techniques such as sputtering and evaporation.

In the embodiment, supporting members 24a and 24b are secured at two points near the nodal points of the vibrating body 14.

This embodiment is also used similarly as the embodiment of FIGS. 11 and 12.

In each of the embodiments shown in FIGS. 11, 12 and 17, though the vibrating body 14 is formed into a regular triangular prism, in the present invention, it may be formed into an isosceles triangular prism. In this case, the piezoelectric elements formed on the side surfaces of the vibrating body 14 having the same area may be used for detection. The vibrating body 14 may also be formed into a triangular prism other than the isosceles triangular prism, or into polygonal prisms such as a quadrangular prism, pentagonal prism, hexagonal prism etc. In this case, piezoelectric elements may be formed, at least, on three side faces of the vibrating body. Either of these piezoelectric elements may be used for driving and the remaining piezoelectric elements for detection. When the driving signal is given to the driving piezoelectric element, the vibrating body is vibrated. Then, when the vibratory gyroscope is rotated about its axis, though its vibrating direction is changed by a Coriolis force, the side surface having the main surface in the direction substantially perpendicular to the vibrating direction of the vibrating body exists thereon. Therefore, if the piezoelectric element formed on the side surface is used for detection, a large output can be obtained. Thus the rotational angular velocity of the vibratory gyroscope can be determined accurately by the large output from the piezoelectric element.

Since the piezoelectric elements are only required to be formed respectively on, at least, three side surfaces of the vibrating body, and it is not necessary to form two piezoelectric elements on one side surface of the vibrating body as compared with the embodiment shown in FIGS. 1 and 2, this results in simple construction and low cost.

Figure 18:
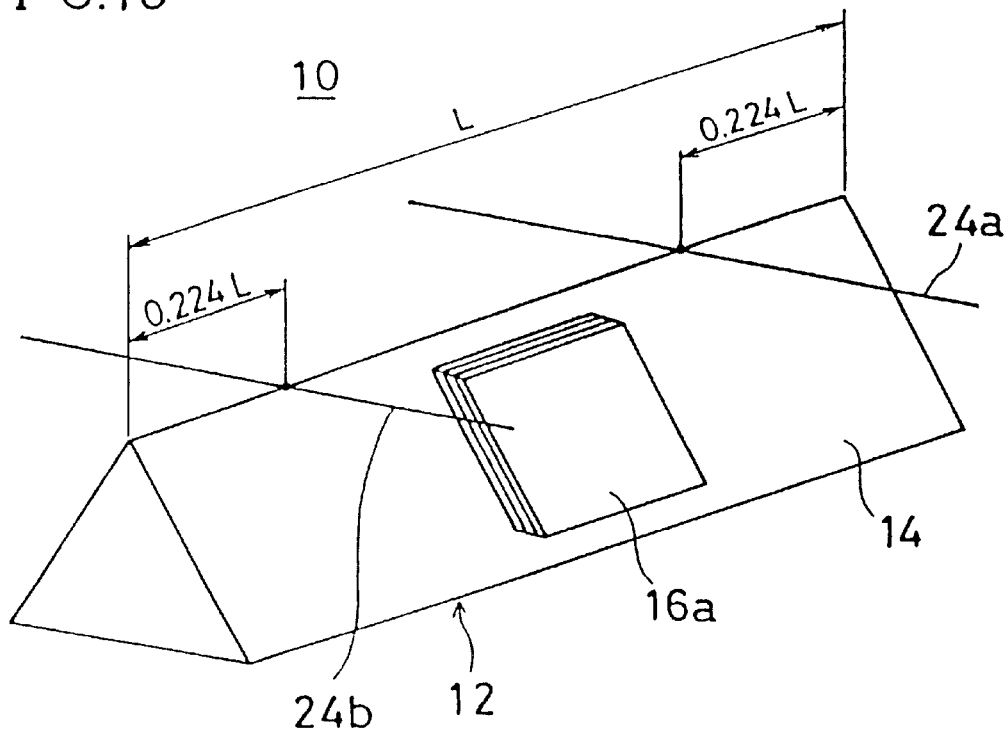
FIG. 18 is a perspective view showing an example of a supporting structure of a vibrator of the present invention.
Figure 19:
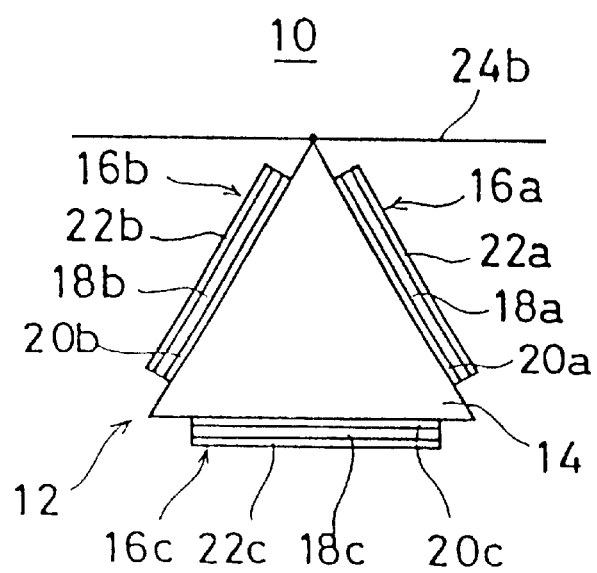
FIG. 19 is a front view thereof.

FIG. 18 is a perspective view showing an example of a supporting construction of a vibrator of the present invention, and FIG. 19 is a front view thereof. In this embodiment, a vibratory gyroscope using the vibrator will be described. The vibratory gyroscope 10 includes a vibrator 12, which includes a vibrating body 14 and driving piezoelectric elements 16a and 16b for vibrating the vibrating body 14. The vibrating body 14 is formed, for example, into a regular triangular prism.

In the center of two side surfaces of the vibrating body 14, the driving piezoelectric elements 16a and 16c are formed respectively. As shown in FIG. 19, one piezoelectric element 16a is provided with electrodes 20a and 22a on both surfaces of a piezoelectric layer 18a. The electrode 20a is bonded to the side surface of the vibrating body 14. Similarly, the other piezoelectric element 16b includes a piezoelectric layer 18b and electrodes 20b, 22b formed on both surfaces thereof, the electrode 20b is bonded to the side surface of the vibrating body 14. By applying the driving signal to the piezoelectric elements 16a and 16b, the vibrating body 14 produces bending vibration in the direction perpendicular to the surface where the piezoelectric elements 16a, 16b are not formed.

In the center of the other side surface of the vibrating body 14, a detecting piezoelectric element 16c is formed. The piezoelectric element 16c includes a piezoelectric layer 18c and electrodes 20c, 22c formed on both surfaces thereof, the electrode 20c is bonded to the side surface of the vibrating body 14. By detecting the output signal from the piezoelectric element 16c, the rotational angular velocity applied to the vibratory gyroscope 10 can be detected.

The vibrating body 14 is supported by two supporting member 24a and 24b, which are connected to an edge between two surfaces where the driving piezoelectric elements 16a, 16b of the vibrating body 14 are formed. The supporting members 24a, 24b are connected near the nodal points of the vibrating body 14. In this embodiment, if the length of the vibrating body 14 is represented by L, connecting points will be 0.224L from opposite ends of the vibrating body 14.

In the vibratory gyroscope 10, the driving signal is supplied to the driving piezoelectric elements 16a, 16b, thereby the vibrating body 14 produces bending vibration in the direction perpendicular to the surface where the piezoelectric elements 16a, 16b are not formed. At this time, vibrating conditions of the surfaces of the vibrating body 14 where the piezoelectric elements 16a, 16b are formed, are symmetrical on both sides of the edge which the supporting members 24a, 24b are connected. Accordingly, connecting portions of the vibrating body 14 and the supporting members 24a, 24b are free from torsion and vibrations of the vibrating body 14 hardly attenuate. When such a supporting construction of the vibrator as the vibratory gyroscope 10 is employed, through holes or the like are not necessary to be formed in the vibrating body 14, and the supporting members 24a, 24b can be connected by welding, so that a good operability can be obtained at manufacturing. Moreover since the through hole is not needed in the vibrating body 14, the vibrator 12 can be made compact.

Figure 20:
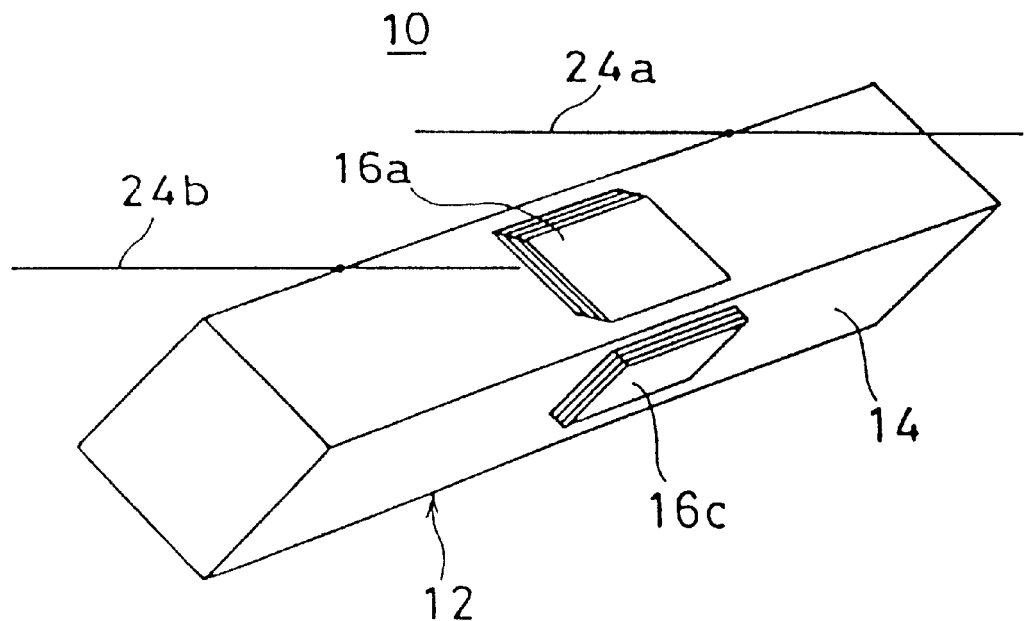
FIG. 20 is a perspective view showing a modified example of the embodiment of FIGS. 18 and 19.
Figure 21:
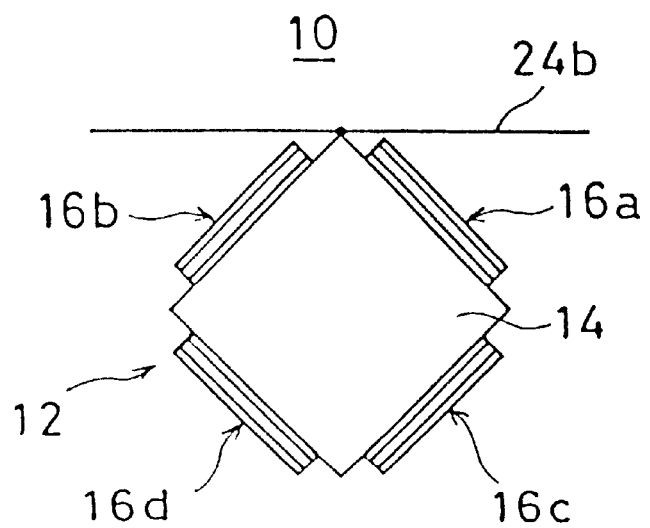
FIG. 21 is a front view thereof.

FIG. 20 is a perspective view of the modified embodiment of FIGS. 18 and 19, and FIG. 21 is a front view thereof. In this embodiment, a vibrating body 14 is formed into a regular quadrangular prism. Driving piezoelectric elements 16a, 16b are formed in the center of adjacent side surfaces of the vibrating body 14, and detecting piezoelectric elements 16c, 16d are formed in the center of the other side surfaces of the vibrating body 14. Supporting members 24a, 24b are connected to an edge between the surfaces of the vibrating body 14 where the driving piezoelectric elements 16a, 16b are formed. The supporting members 24a, 24b are connected near the nodal points of the vibrating body 14 as with the embodiment shown in FIGS. 18 and 19.

Figure 22:
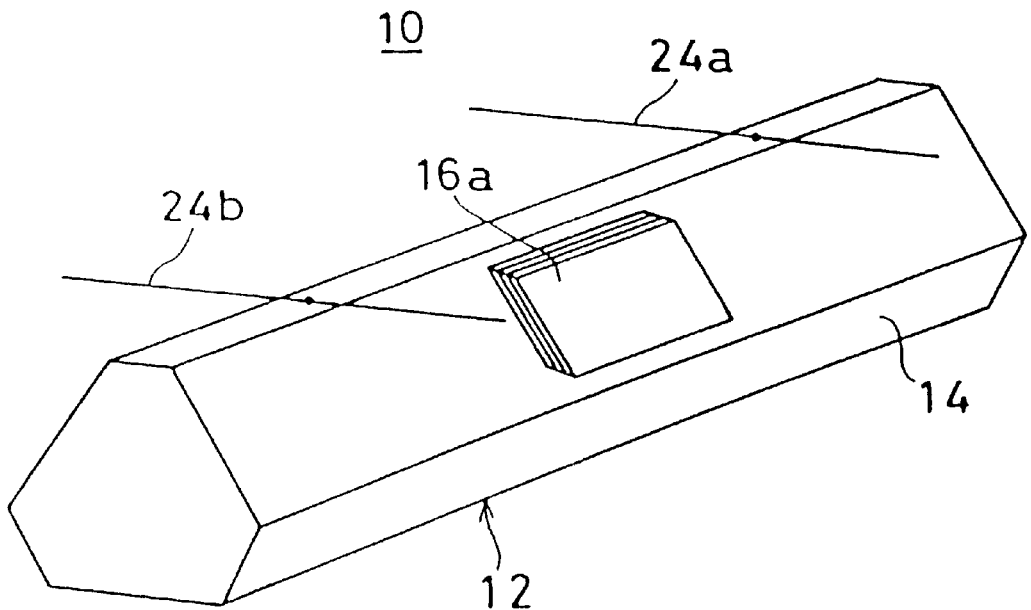
FIG. 22 is a perspective view showing another modified example of the embodiment of FIGS. 18 and 19.
Figure 23:
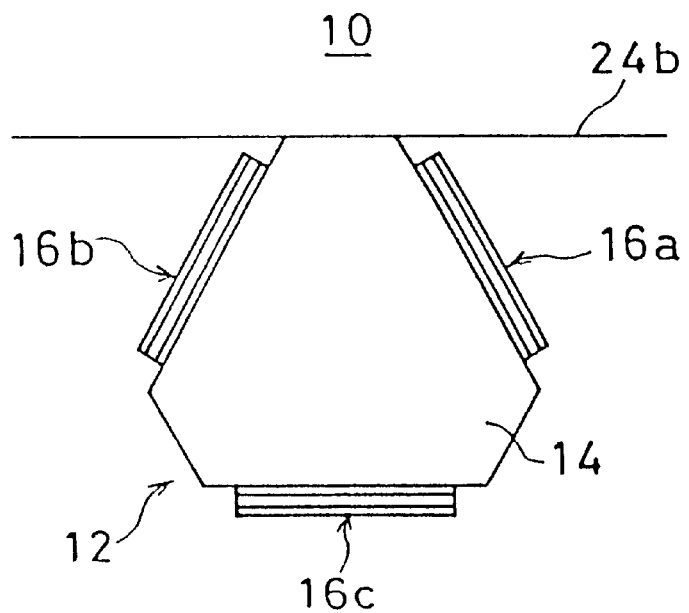
FIG. 23 is a front view thereof.

As shown in FIGS. 22 and 23, the vibrating body 14 may be formed into a hexagonal prism by shaving off edge portions of the vibrating body 14 shown in FIGS. 18 and 19. In this case, to the plane between the surfaces of the vibrating body 14 where the driving piezoelectric elements 16a, 16b are formed, the supporting members 24a, 24b are connected. At this time, the supporting members 24a, 24b are connected on the center line of the plane between the surfaces of the vibrating body 14 where the driving piezoelectric elements 16a, 16b are formed. It is to be understood that, also in the embodiment, the supporting members 24a, 24b are connected near the nodal points.

Also in the embodiments of FIGS. 20, 21 and FIGS. 22, 23, vibrations of the vibrating body 14 are hardly attenuated due to the supporting members 24a, 24b, and a good operability can be obtained at manufacturing and the vibrator can be made in compact size.

That is, each of the supporting constructions of the vibrator is designed to support the vibrator including the polygonal prism shaped vibrating body, and the driving piezoelectric elements for the vibrating the vibrating body formed on two side surfaces of the vibrating body which are not in parallel, and supported near the nodal point of the vibrating body at two points on a longitudinal straight line of the vibrating body and at an equally spaced relation from two surfaces of the vibrating body where the driving piezoelectric elements are formed.

Therefore, vibrating conditions of the vibrating body surfaces where the driving piezoelectric elements are formed are symmetrical on both sides of a straight line connecting the two supporting points.

Accordingly, since the vibrating conditions of the surfaces of the vibrating body where the driving piezoelectric elements are formed are symmetrical on both sides of the straight line connecting the two supporting points, torsion of the vibrating body is hardly occurred at the supporting points. Thus vibrations of the vibrating body are hardly attenuated due to the supporting members.

Also, since the supporting points are on the surface of the vibrating body, through holes or the like are not necessary to be formed in the vibrating body as in the past and this results in improved ease of manufacturing. Moreover, since it is not necessary to form the through holes in the vibrating body, the vibrator can be formed in a compact size.

Figure 24:
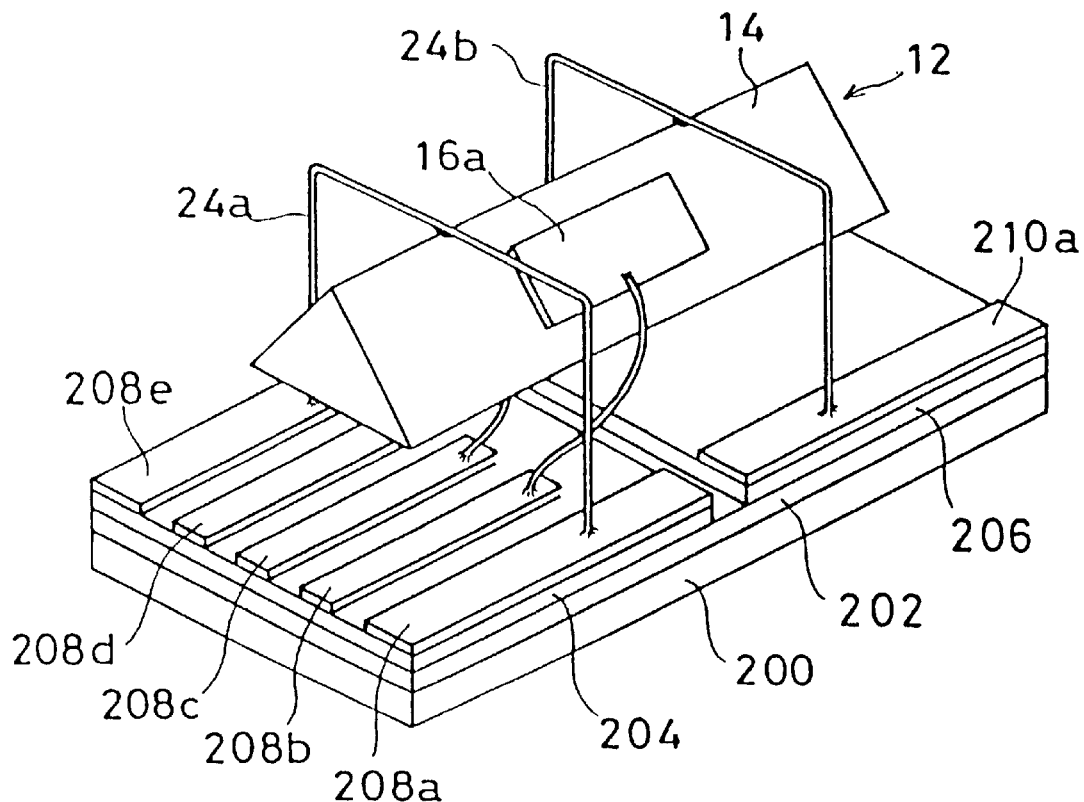
FIG. 24 is a perspective view showing another example of supporting structure of a vibrator of the present invention.
Figure 25:
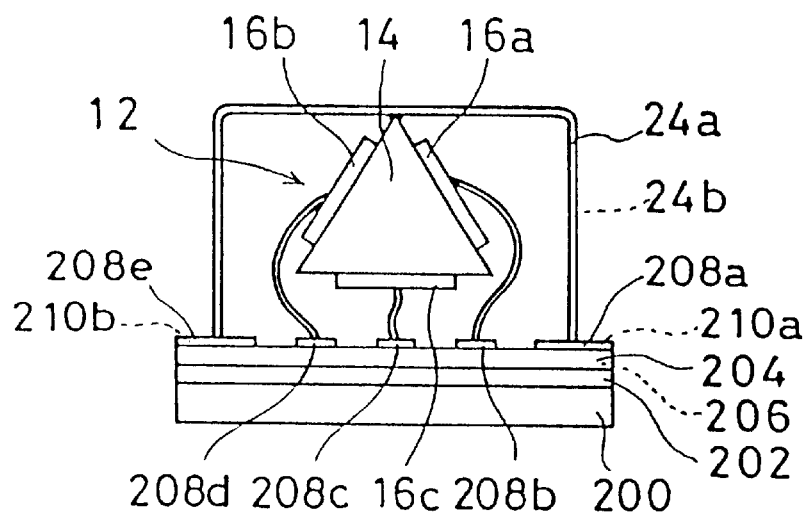
FIG. 25 is a front view thereof.

FIG. 24 is a perspective view showing another supporting construction of a vibrator according to the present invention, and FIG. 25 is a front view thereof.

The vibrator 12 includes a regular triangular prism shaped vibrating body 14.

On the vibrating body 14, piezoelectric elements 16a, 16b and 16c are formed respectively in the center of three side surfaces.

Furthermore, with respect to the vibrating body 14, if the longitudinal length thereof is represented by L, on the edge portion between the surfaces where the piezoelectric elements 16a and 16b are formed, at portions 0.224L inward from its opposite ends, the center portions of U-shaped supporting members 24a and 24b made of, for example, a wire material are secured respectively, for example, by means of welding or bonding.

In the vibrator 12, when the driving signal is supplied to the piezoelectric elements 16a and 16b or to the piezoelectric element 16c, the vibrating body 14 is vibrated in the direction perpendicular to the main surface of the piezoelectric element 16c. In this case, the nodal points of the vibrator 12, if the longitudinal length of the vibrating body 14 is represented by L, exist on the center axis of the vibrating body 14 at points 0.224L inward from its opposite ends. Therefore, the two supporting members 24a and 24b bend reversely relative to each other axially of the vibrating body 14.

The supporting construction of the present embodiment includes a rectangular plate supporting base 200 consisting of a material such as metal or ceramic. On one main surface of the supporting base 200, a buffer 202 consisting of an elastic material such as rubber, sponge and the like is bonded.

On one main surface of the buffer 202, two substrates 204 and 206 divided longitudinally thereof are bonded. On one main surface of one substrate 204, five electrodes 208a, 208b, 208c, 208d and 208e are formed laterally in spaced relation. On the main surface of the other substrate 206, electrodes 210a and 210b are formed respectively on opposite ends laterally thereof.

To the electrodes 208a and 208e of the substrate 204, opposite ends of the supporting member 24a of the vibrator 12 are secured respectively, for example, by welding or the like. Similarly, both ends of the other supporting member 24b are secured respectively to the electrodes 210a and 210b of the other substrate 206.

To the electrodes 208b, 208d and 208c of the substrate 204, piezoelectric elements 16a, 16b and 16c are electrically connected respectively, for example, by lead wires.

In the embodiment, when the driving signal is supplied to the electrodes 208b and 208d on the substrate 204, namely, to the piezoelectric elements 16a and 16b, or to the electrode 208c namely, to the piezoelectric element 16c, the vibrator 12 is driven. In this case, though the supporting members 24a and 24b bend reversely relative to each other longitudinally of the vibrating body 14, the divided substrates 204 and 206 are displaced separately. Therefore, the supporting members 24a and 24b do not interfere with each other, thus vibrations of the vibrator 12 are not suppressed by the supporting members 24a and 24b. Accordingly, a stable vibrating attitude of the vibrator 12 can be assured.

Also, in this embodiment since the buffer 202 is formed between the supporting base 200 and the substrates 204, 206, a bad influence by external vibrating noises can be minimized.

Figure 26:
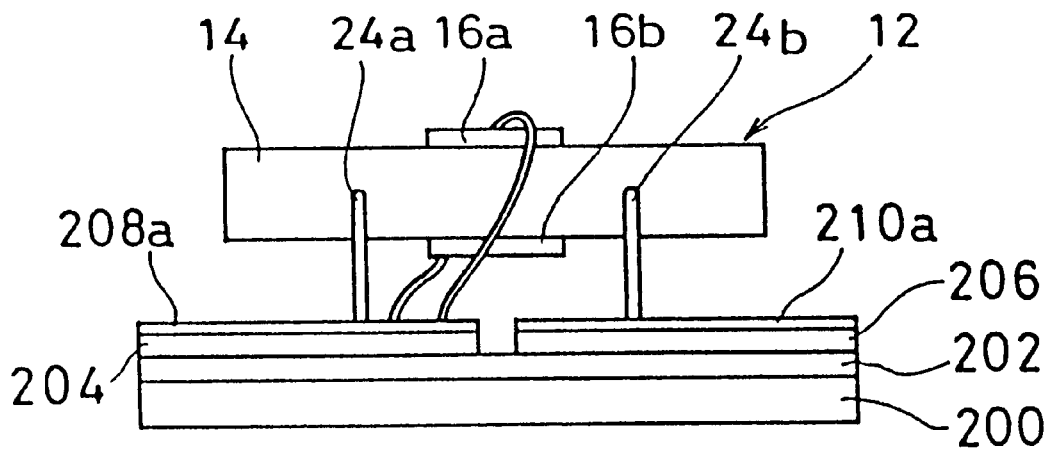
FIG. 26 is a side view showing a modified example of the embodiment of FIGS. 24 and 25.
Figure 27:
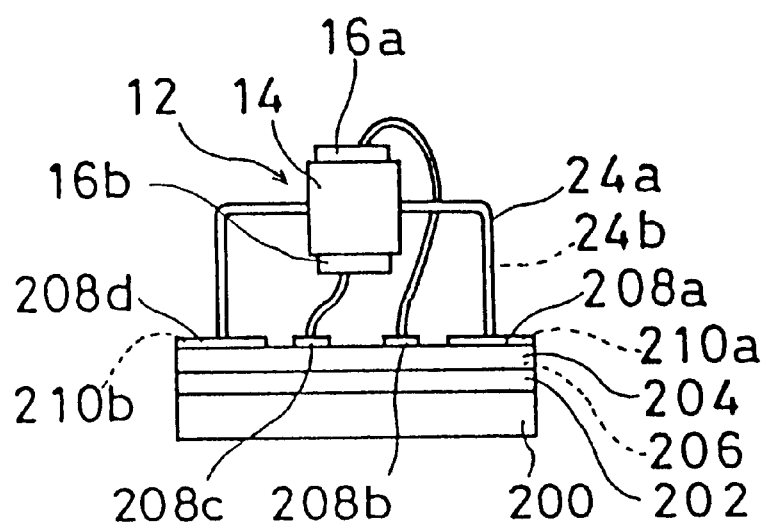
FIG. 27 is a front view thereof.

FIG. 26 is a side view showing the modified embodiment of FIGS. 24 and 25, and FIG. 27 is a front view thereof.

In the embodiment, as compared with the embodiment of FIGS. 24 and 25, in particular, a vibrating body 14 of a vibrator 12 being supported is formed into a quadrangular prism. Piezoelectric elements 16a and 16b are formed in the center of two opposing upper and lower side surfaces of the vibrating body 14. Two supporting members 24a and 24b are secured as extending through the center laterally of the side surfaces of the vibrating body 14 where piezoelectric elements are not formed.

On one main surface of the substrate 204, four electrodes 208a, 208b, 208c and 208d are formed in spaced relation laterally thereof. Both ends of the supporting member 24a are secured respectively to the electrodes 208a and 208d on the opposite sides. To the center electrodes 208b and 208c, the piezoelectric elements 16a and 16b are connected electrically respectively by lead wires.

In this embodiment, when the driving signal is supplied to the center electrode 208b or 208c of the substrate 204, the vibrator 12 is driven. In this case, also in this embodiment, though the two supporting members 24a and 24b bend reversely relative to each other longitudinally of the vibrating body 14, the substrates 204 and 206 onto which these supporting members 24a and 24b are secured are displaced separately, so that a stable vibrating attitude of the vibrator 12 can be assured.

In the embodiment, since the buffer 202 is formed also between the supporting base 200 and the substrates 204, 206, external vibrating noises can be absorbed.

In each of the embodiments shown in FIGS. 24 through 27, though the substrate is divided into two, in the present invention, the substrate may be divided more than the number of supporting members of the vibrator.

That is, the supporting construction of a vibrator according to the present invention is designed to support the vibrator provided with a plurality of supporting members, and including a supporting base, a buffer formed thereon and substrates which are divided and formed on the buffer and to which a plurality of supporting members are secured separately.

Therefore, when the vibrator makes bending vibration, though the plurality of supporting members are also bent, in this case, they are displaced together with the divided substrates independently.

Thus, since the plurality supporting members are displayed independently, vibrations of the vibrator are not suppressed due to the supporting members. Accordingly, a stable vibrating attitude of the vibrator is assured.

Figure 28:
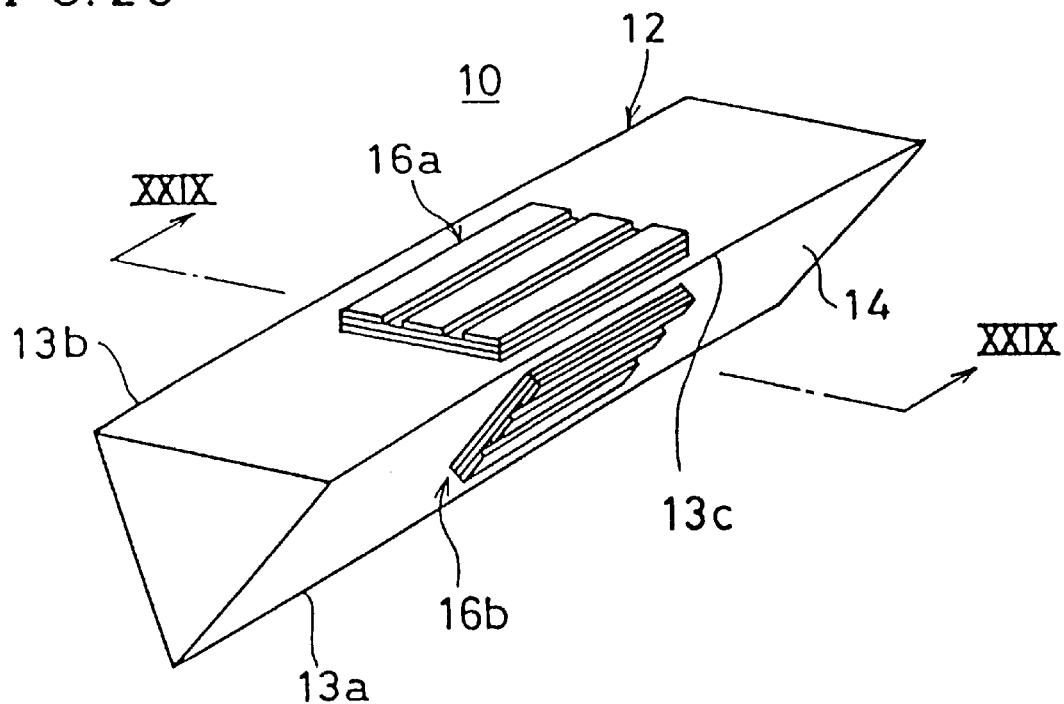
FIG. 28 is a perspective view showing still another embodiment of the present invention.
Figure 29:
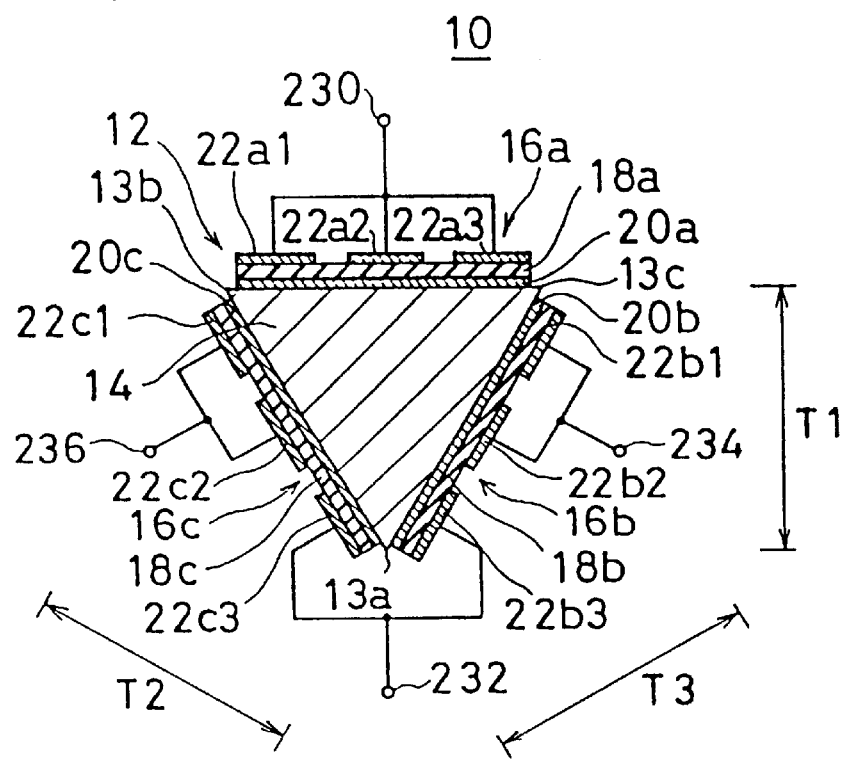
FIG. 29 is a sectional view taken along the line XXIX—XXIX of FIG. 28.

FIG. 28 is a perspective view showing still another embodiment of the present invention, and FIG. 29 is a sectional view taken along the line XXIX—XXIX of FIG. 28.

A vibrator 12 of a vibratory gyroscope 10 includes, for example, a regular triangular prism shaped vibrating body 14.

On the vibrating body 14, piezoelectric elements 16a, 16b and 16c are formed respectively in the center of three side surfaces thereof.

The piezoelectric element 16a includes a piezoelectric layer 18a consisting of, for example, ceramic, and on one surface thereof, a mounting electrode 20a is formed. The mounting electrode 20a is bonded to the side surface of the vibrating body 14, for example, by adhesives. Moreover, on the other main surface of the piezoelectric layer 18a, connecting electrodes 22a1, 22a2 and 22a3 divided into three laterally of the side surface of the vibrating body 14 are formed.

Similarly, the other piezoelectric elements 16b and 16c also include piezoelectric layers 18b and 18c consisting of, for example, ceramics, and on one surfaces thereof, also mounting electrodes 20b and 20c are formed respectively.

These mounting electrodes 20b and 20c are also bonded to the side surfaces of the vibrating body 14, for example, by adhesives. On the other main surface of the piezoelectric layer 18b, connecting electrodes 22b1, 22b2 and 22b3 divided into three laterally of the side surface of the vibrating body 14 are formed, and on the other main surface of the piezoelectric layer 18c, connecting electrodes 22c, 22c2 and 22c3 divided into three laterally of the side surface of the vibrating body 14 are also formed.

Each of the electrodes described above are made of an electrode material such as gold, silver, aluminum, nickel, copper-nickel alloy (Monel Metal) and the like, and formed by thin-film techniques such as sputtering, evaporation and the like, or by printing techniques depending on the material.

If the vibrating body 14 is formed with a vibrating material comprising a metal such as elinver, ferro-nickel alloy, the electrodes 20a–20c of the piezoelectric elements 16a–16c may not be formed. It is because that, the vibrating body 14 serves as these electrodes 20a–20c. In this case, the piezoelectric layers 18a–18c may be made with a piezoelectric material such as PZT, ZnO etc. and formed by thin film techniques such as sputtering, evaporation etc.

In the vibratory gyroscope 10, for example, the piezoelectric element 16a is used for driving and the remaining two piezoelectric elements 16b and 16c for detection.

Therefore, in the embodiment, to the connecting electrodes 22a1, 22a2 and 22a3 of the driving piezoelectric element 16a, a driving terminal 230 is connected. To the connecting electrodes 22b3 and 22c3 of the detecting piezoelectric elements 16b and 16c which are located extremely far away from the driving piezoelectric element 16a, a feedback terminal 232 is connected. Moreover, to the two connecting electrodes 22b1 and 22b2 among the connecting electrodes of the detecting piezoelectric element 16b which are close to the driving piezoelectric element 16a, one detecting terminal 234 is connected. Similarly, to the two connecting electrodes 22c1 and 22c2 of the other detecting piezoelectric element 16c, another detecting terminal 236 is connected.

In the vibratory gyroscope 10, by shaving off an edge portion between the side surfaces of the vibrating body 14, the resonance frequency on the driving side and respective resonance frequencies on the detecting side are made coincident to each other.

That is, if the edge portion 13a opposing the driving piezoelectric element 16a is shaved off, the resonance frequency in the direction perpendicular to the main surface of the driving piezoelectric element 16a is controlled without influencing the vibrating direction of the vibrating body 14. Similarly, if the edge portion 13b or 13c opposing the detecting piezoelectric elements 16b or 16c is shaved off, the resonance frequency in the direction perpendicular to the main surface of the piezoelectric element 16b or 16c is controlled without influencing the vibrating direction of the vibrating body 14. In this case, if the edge portion is shaved off at the longitudinal center, in particular, thickness T1, T2 or T3 in the vibrating direction shown in FIG. 29 is substantially thinned, as a result, the resonance frequency is reduced, and if longitudinal ends of the edge potion are shaved off, additional mass is substantially reduced and conversely the resonance frequency increases.

In the vibratory gyroscope 10, when all resonance frequencies in three directions perpendicular to the main surfaces of the piezoelectric elements 16a, 16b and 16c are different, these resonance frequencies are matched by shaving off at least two edge portions, and when the resonance frequency in one direction is different from the other resonance frequency in two directions, at least one edge portion is shaved off to coincide with these resonance frequencies. Thereby, the resonance frequency on the driving side is matched with respective resonance frequencies on the detecting side.

When coinciding the resonance frequency on the driving side with those on the detecting sides, the longitudinal center of the edge portions of the vibrating body 14 are preferably shaved off. When matching the resonance frequencies by shaving off the center of the edge portions of the vibrating body 14, the edge portion associated with the highest resonance frequency may be shaved off first.

Figure 30:
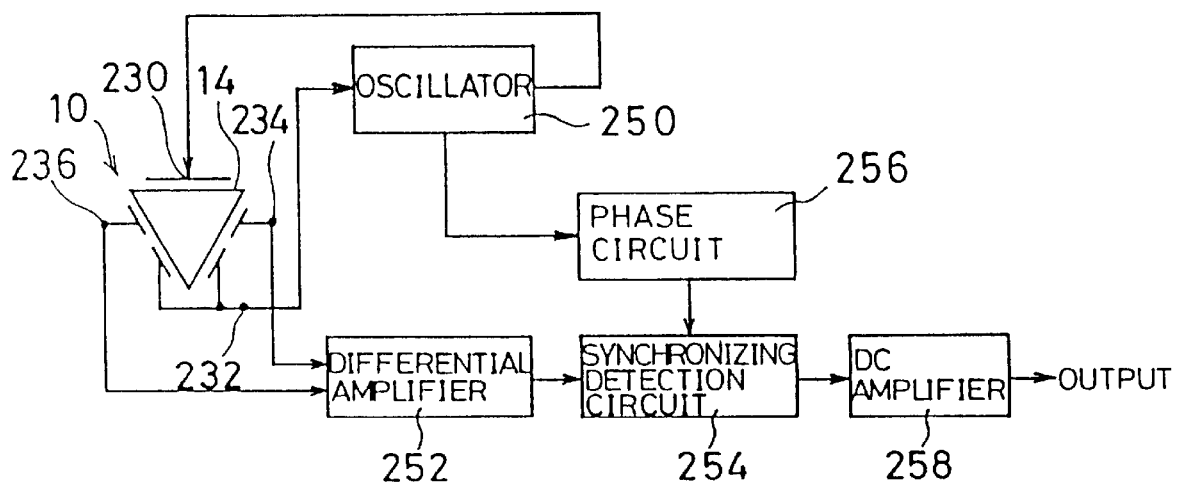
FIG. 30 is a block diagram showing an example of a vibratory gyroscopic apparatus using the vibratory gyroscope shown in FIGS. 28 and 29.

In the vibratory gyroscope 10, as particularly shown in FIG. 30, to the feedback terminal 232 and the driving terminal 230, an oscillator 250 as a feedback loop is connected. Thus, the vibratory gyroscope 10 produces self-oscillation drive. In this case, the vibrating body 14 is vibrated in the direction perpendicular to the main surface of the driving piezoelectric element 16a, and the output signal is obtained from the detecting piezoelectric elements 16b and 16c or the detecting terminals 234 and 236.

As shown in FIG. 30, the detecting terminals 234 and 236 are connected to an inversion input end and a non-inversion input end of a differential amplifier 252. An output end of the differential amplifier 252 is connected to an input end of a synchronizing detection circuit 254, to which the aforesaid oscillation circuit 250 is connected via a phase circuit 256. In this case, the phase circuit 256 is controlled such that, the signal on the positive or negative side of the output difference between the detecting terminals 234 and 236 can be obtained from an output end of the synchronizing detection circuit 254. The output end of the synchronizing detection circuit 254 is connected to an input end of DC amplifier 258 for rectifying the signal therefrom.

In the following, the operation of the vibratory gyroscope 10 will be particularly described.

Figure 31:
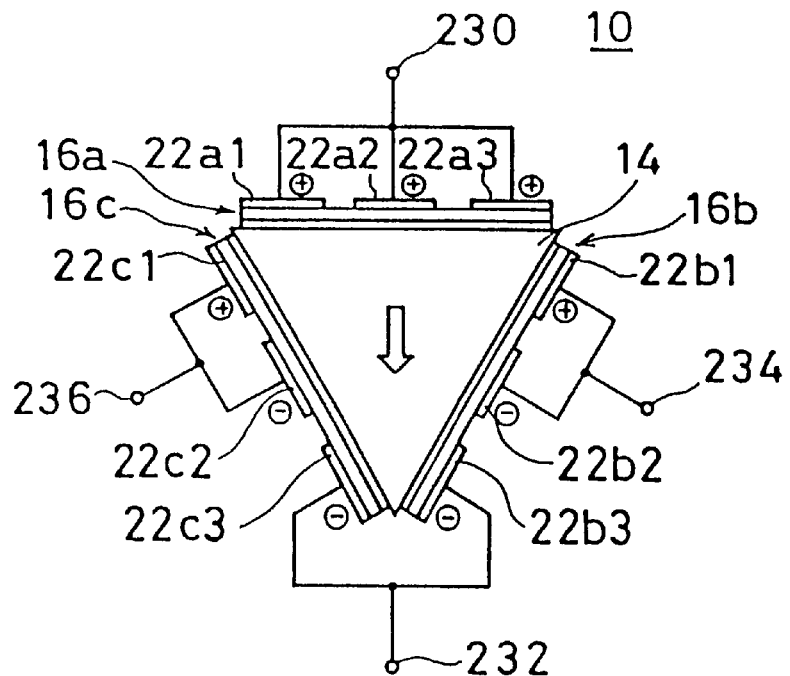

First, it is assumed that, when the vibratory gyroscope 10 is not rotated, opposite ends of the vibrating body 14 bend, for example, in the direction shown by the arrow in FIG. 31, or reversely to the surface where the driving piezoelectric element 16a is formed. In this case, since the bending conditions of the piezoelectric layer 18b of the detecting piezoelectric element 16b at portions close to and apart from the driving piezoelectric element 16a are different, the voltages generated are not equal. Therefore, if the positive voltage is output from the connecting electrode 22b1 close to the driving piezoelectric element 16a, the negative voltage is output from the connecting electrode 22b2 apart therefrom. Thus, the voltages of the connecting electrodes 22b1 and 22b2 cancel each other, and the output voltage taken out from the detecting terminal 234 is deteriorated. Similarly, the positive voltage is output from the connecting electrode 22c1 of the other detecting piezoelectric element 16c, and the negative voltage is output from the connecting electrode 22c2. Thus, these voltages cancel each other, and the output voltage output from the other detecting terminal 236 is also deteriorated. When opposite ends of the vibrating body 14 bend in the direction in which the driving piezoelectric element 16a is formed, the output voltage signals from these connecting electrodes are inverted.

Figure 32:
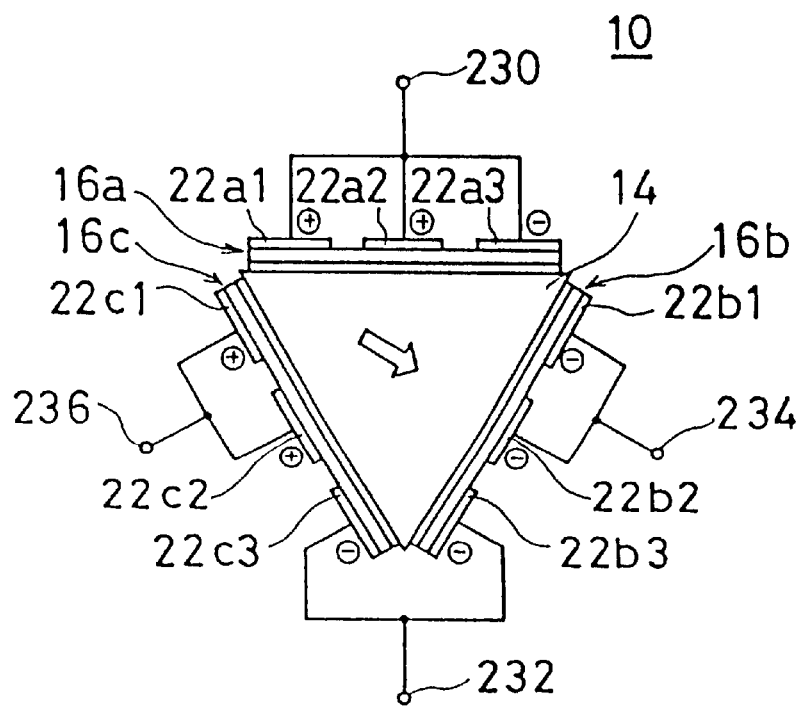

When considering the case when the vibratory gyroscope 10 is rotated about its axis, by vector composition of the vibration direction at non-rotation and a Coriolis force due to rotation, for example, as shown in FIG. 32, bending vibration takes place in the direction perpendicular to the face where the detecting piezoelectric element 16b is formed. In this case, assuming that opposite ends of the vibrating body 14, as shown by the arrow in FIG. 32, bend in the direction in which the detecting piezoelectric element 16b is formed, the negative voltage is output from the connecting electrodes 22b1 and 22b2 of the detecting piezoelectric element 16b, and the positive voltage is output from the connecting electrodes 22c1 and 22c2 of the detecting piezoelectric element 16c. Thus, from one detecting terminal 234, a large value negative voltage is output, and from the other detecting terminal 236, a large value positive voltage is output. When opposite ends of the vibrating body 14 bend reversely relative to the surface where the detecting piezoelectric element 16b is formed, the output voltage signals output from these connecting electrodes are inverted.

Figure 33:
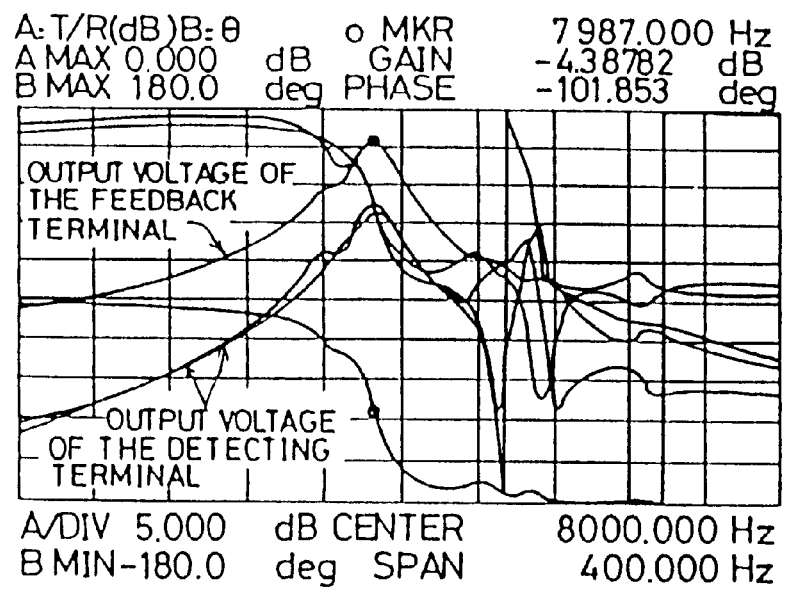
FIG. 33 is a graph showing frequency characteristics before the resonance frequency on the driving side is made coincident with the resonator characteristics on the detecting side in the vibratory gyroscope shown in FIGS. 28 and 29.
Figure 34:
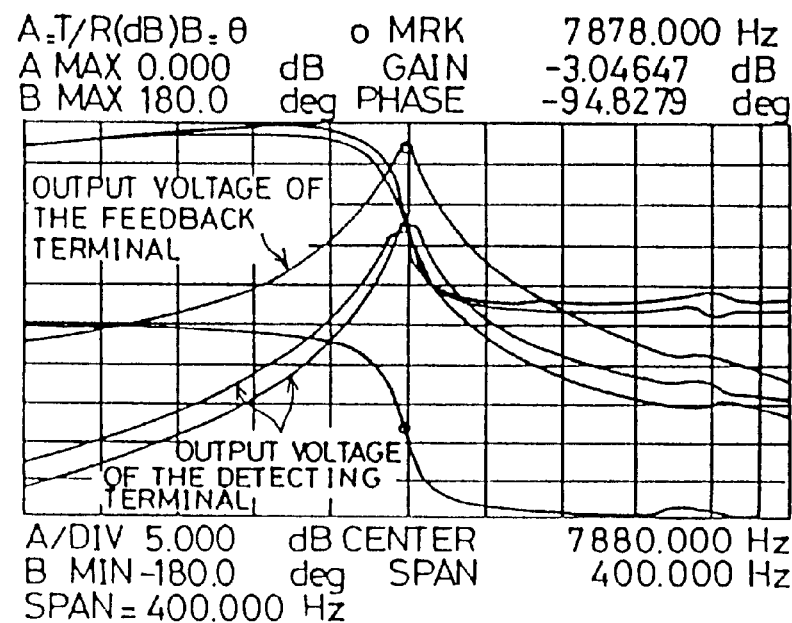
FIG. 34 is a graph showing frequency characteristics when the resonance frequency on the driving side is made coincident with resonance frequency on the detecting side in the vibratory gyroscope shown in FIGS. 28 and 29.

In the vibratory gyroscope 10, since the resonance frequencies on the driving and detecting sides are matched, the outputs from the detecting piezoelectric elements 16b and 16c or the detecting terminals 234 and 236 are obtained efficiently. As a result the rotational angular velocity can be detected efficiently. That is, frequency characteristics in the vibratory gyroscope 10 before matching the resonance frequencies on the driving and detecting sides are shown in FIG. 33 and those at coincidence of the resonance frequencies are shown in FIG. 34.

Furthermore, in the vibratory gyroscope 10, the output voltage difference at non-rotation and rotation is large, results in a good S/N ratio. Besides, since the output signal difference between the detecting terminals 234 and 236 is detected, the output voltage at non-rotation becomes even smaller and that at rotation becomes even larger.

Figure 35:
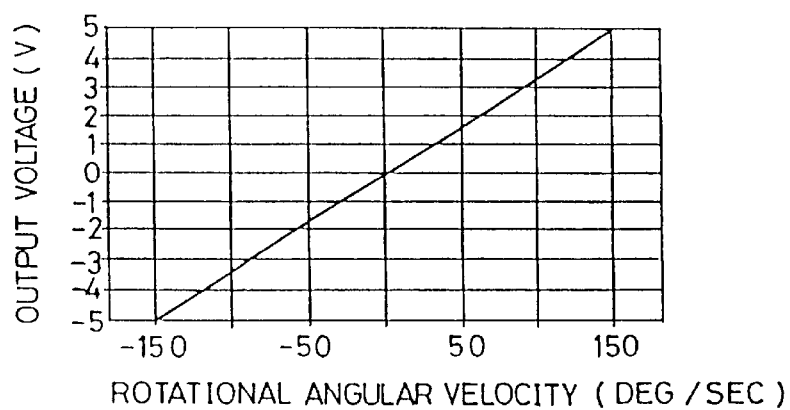
FIG. 35 is a graph showing output voltage characteristics representing the relationship between the rotational angular velocity and the output voltage when a vibratory gyroscope is incorporated in the vibratory gyroscopic apparatus shown in FIG. 30.
Figure 36:
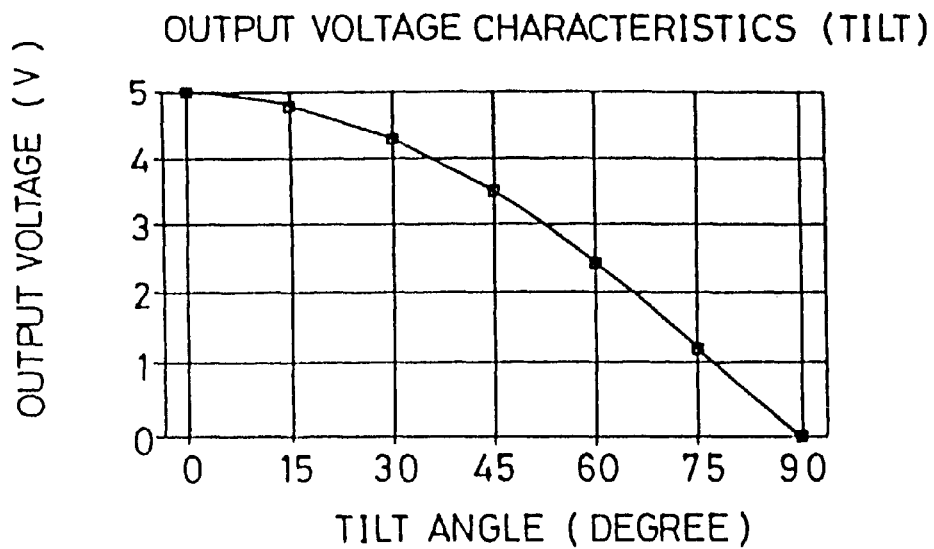
FIG. 36 is a graph showing output voltage characteristics representing the relationship between the tilt angle of the vibratory gyroscope and the output voltage in the vibratory gyroscopic apparatus shown in FIG. 30.

Output voltage characteristics representing the relationship between the rotational angular velocity (DEG/SEC) and the output voltage (V) when the vibratory gyroscope 10 is erected is shown in FIG. 35, and those representing the relationship between the tilt angle (degree) and the output voltage (V) thereof is shown in FIG. 36.

Figure 37:
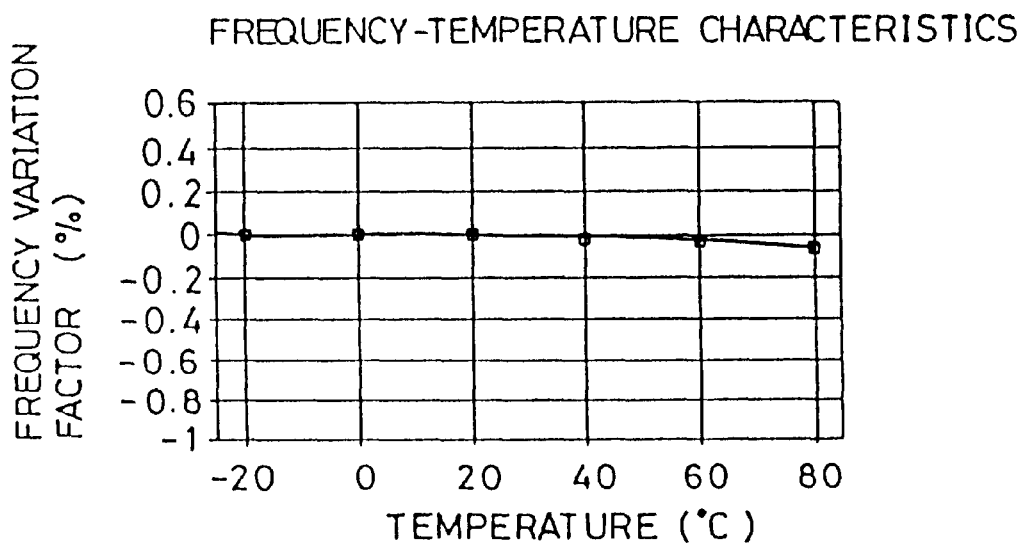
FIG. 37 is a graph showing frequency temperature characteristics when a vibrating body is formed of an annealed material in the vibratory gyroscope shown in FIGS. 28 and 29.

When elinver annealed at 600° C. for two hours was used as a material of the vibrating body 14, in the vibrating gyroscope 10, as shown in FIG. 37, a good frequency temperature characteristics having a low frequency variation factor (%) against the temperature (°C.) variation was obtained.

Figure 38:
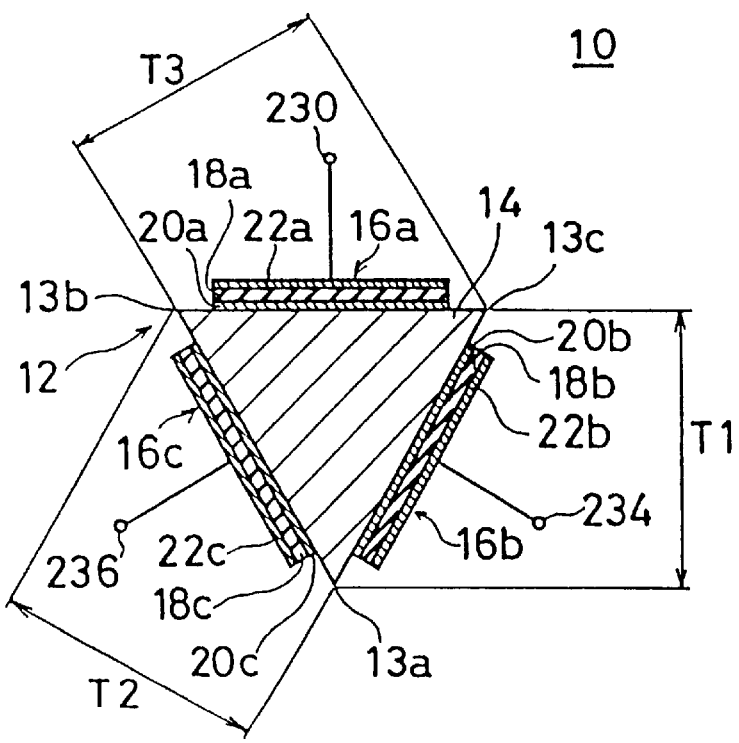
FIG. 38 is a sectional view showing a modified embodiment of FIGS. 28 and 29.

FIG. 38 is a sectional view showing the modified embodiment of FIGS. 28 and 29. In the embodiment, as compared with the embodiment of FIGS. 28 and 29, in particular, entirely on the other main surfaces of the piezoelectric layers 18a, 18b and 18c, connecting electrodes 22a, 22b and 22c are formed respectively. Accordingly, in the embodiment, the driving terminal 230 is connected to one connecting electrode 22a and the detecting terminals 234 and 236 are connected respectively to the connecting electrodes 22b and 22c. In the embodiment, the outputs from the detecting terminals 234 and 236 are fed back to the driving terminal 230 in the composite form for self-oscillation drive.

Also, in this embodiment, as with the embodiment of FIGS. 28 and 29, the edge portion 13a, 13b or 13c of the vibrating body 14 is shaved off to match the resonance frequencies on the driving and detecting sides, so that the rotational angular velocity can be detected efficiently.

Figure 39:
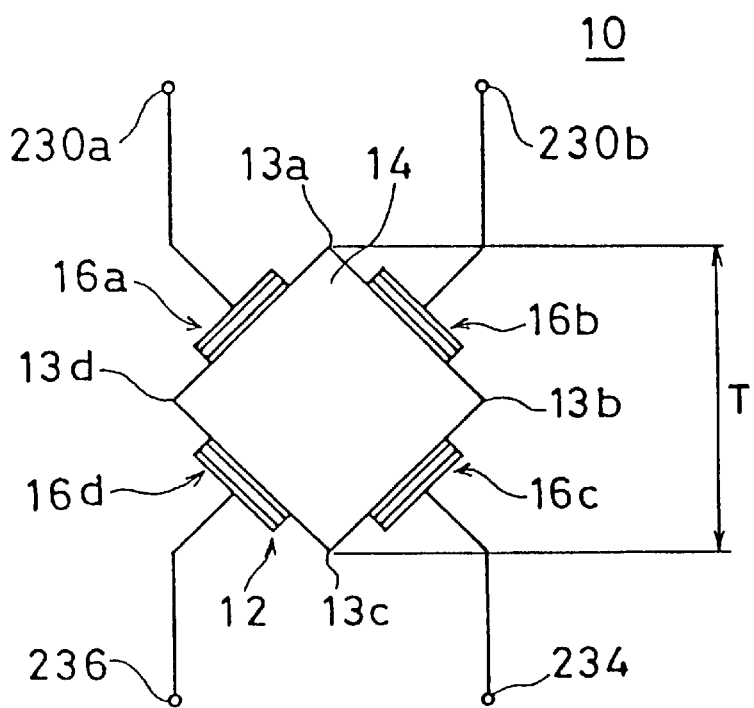
FIG. 39 is an illustrative view showing another modified embodiment of FIGS. 28 and 29.

FIG. 39 is an illustrative view showing another modified embodiment of FIGS. 28 and 29. In the embodiment, in particular, a vibrating body 14 is formed into a regular quadrangular prism, and on four side surfaces thereof, piezoelectric elements 16a, 16b, 16c and 16d are formed respectively. In this embodiment, two adjoining piezoelectric elements 16a and 16b are used for driving and the remaining two piezoelectric elements 16c and 16d are used for detection. Thus, to the driving piezoelectric elements 16a and 16b, driving terminals 230a and 230b are connected respectively, and to the detecting piezoelectric elements 16c and 16d, detecting terminals 234 and 236 are connected respectively.

Moreover, in the embodiment, the edge portion between the side surfaces of the vibrating body 14 are shaved off to match the resonance frequencies on the driving and detecting sides. In this case, by shaving off the edge portion 13a between the side surfaces where the driving piezoelectric elements 16a and 16b are formed, or the edge portion 13c between the side surfaces where the detecting piezoelectric elements 16c and 16d are formed, the thickness T and additional mass of the vibrating body 14 associated with the resonance frequency on the driving side can be changed, and the resonance frequency on the driving side is mainly controlled without influencing the vibrating direction of the vibrating body 14. Also, by shaving off the other edge portion 13b or 13d, the resonance frequency on the detecting side can be controlled without influencing the vibrating direction and the resonance frequency in the driving side.

Accordingly, also in this embodiment, the output from the detecting piezoelectric element is obtained efficiently and the rotational angular velocity can be detected efficiently.

Though the vibrating body 14 is formed into a regular triangular prism or a quadrangular prism in each of the embodiments shown in FIGS. 28 through 39, it may be formed into another polygonal prism. In this case, the piezoelectric elements may be formed respectively on at least, three or more side surfaces of the vibrating body. The piezoelectric elements formed on the side surfaces which are not arranged in parallel may be used for one of driving and detection, and the other piezoelectric elements may be used for the other of driving and detection. Moreover, the resonance frequencies on the driving and detecting sides may be matched by shaving off the edge portion between the side surfaces of the vibrating body.

If the edge portion between the side surfaces of the vibrating body is shaved off to match the resonance frequencies on the driving and detecting sides, since the piezoelectric elements formed on the side surfaces of the vibrating body which are not arranged in parallel are used for one of driving and detection, even when the edge portion between the side surfaces of the vibrating body is shaved off, the vibrating direction of the vibrating body is not deviated, thus detecting errors can be eliminated.

Thus, the output from the detecting piezoelectric element is obtained efficiently and the rotational angular velocity of the vibratory gyroscope can be detected efficiently.

Figure 40:
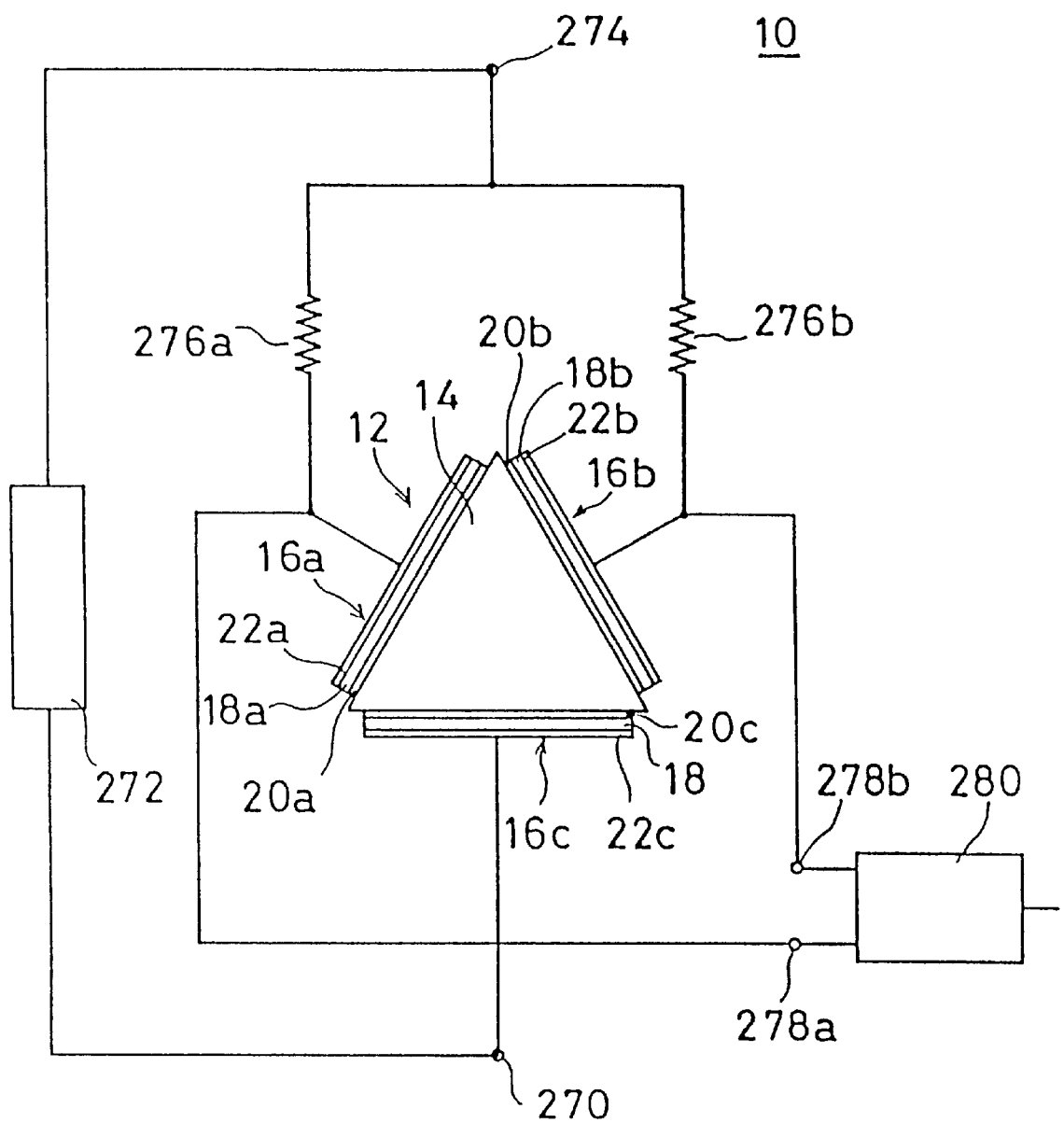
FIG. 40 is an illustrative view showing a separate embodiment of the present invention.

FIG. 40 is an illustrative view showing a separate embodiment of the present invention.

In the vibrator 12, any two of piezoelectric elements 16a–16c are used for driving and the remaining one is used for feedback. In the embodiment, for example, the piezoelectric elements 16a and 16b are used for driving and the other piezoelectric element 16c is used for feedback.

An electrode 22c of the feedback piezoelectric element 16c is connected to an input end of an oscillator 272 via a feedback terminal 270. An output end of the oscillator 272 is connected to a driving terminal 274, which is then connected to an electrode 22a of the driving piezoelectric element 16a via a fixed resistance 276a, and to an electrode 22b of the driving piezoelectric element 16b via a fixed resistance 276b. Therefore, the output of the feedback piezoelectric element 16c is fed back to the two driving piezoelectric elements 16a and 16b via the oscillator 272 and so on, and the vibrator 12 produces self-oscillation drive. In this case, the vibrating body 14 of the vibrator 12 is vibrated in the direction composed of two driving directions by the two driving piezoelectric elements 16a and 16b. Thus, in the embodiment, amplitudes of the vibrating body 14 are larger as compared with the case driven by one driving piezoelectric element. In addition, the vibrating attitude of the vibrating body 14 is stable against mechanical state variations such as variation with time, temperature variation, variation of mounting angle and variation of gravity (position of center of gravity).

To the electrodes 22a and 22b on the input side of the driving piezoelectric elements 16a and 16b, detecting terminals 278a and 278b are connected respectively. The detecting terminals 278a and 278b are designed to detect impedance variations of the driving piezoelectric elements 16a and 16b which change responsive to the rotational angular velocity of the vibratory gyroscope 10.

The detecting terminals 278a and 278b are connected respectively to two input ends of the differential amplifier 280. In the differential amplifier 280, impedance variations of the driving piezoelectric elements 16a and 16b are detected as potential differences between the electrodes 22a and 22b. Thus, the rotational angular velocity of the vibratory gyroscope 10 can be determined by the output from the differential amplifier 280.

In the vibratory gyroscope 10, since the vibrator 12 having a large amplitude is used, the sensibility of the rotational angular velocity is improved. Besides, as the vibrating attitude of the vibrating body 14 is stable against the mechanical state variation such as the variation with time, the rotational angular velocity can be detected stably.

Furthermore, in the vibratory gyroscope 10, since the rotational angular velocity is measured by detecting the potential difference between the electrodes 22a and 22b of the driving piezoelectric elements 16a and 16b, or the potential difference on the input side of the driving piezoelectric element without using the exclusive detecting piezoelectric-element, even if characteristic variations, such as variations with time and temperature variations occur in the piezoelectric elements 16a–16c, the rotational angular velocity can be measured accurately as the driving voltage is combined and stabilized, without being influenced by the characteristics of the piezoelectric elements or their resonance frequency deviation.

Figure 41:
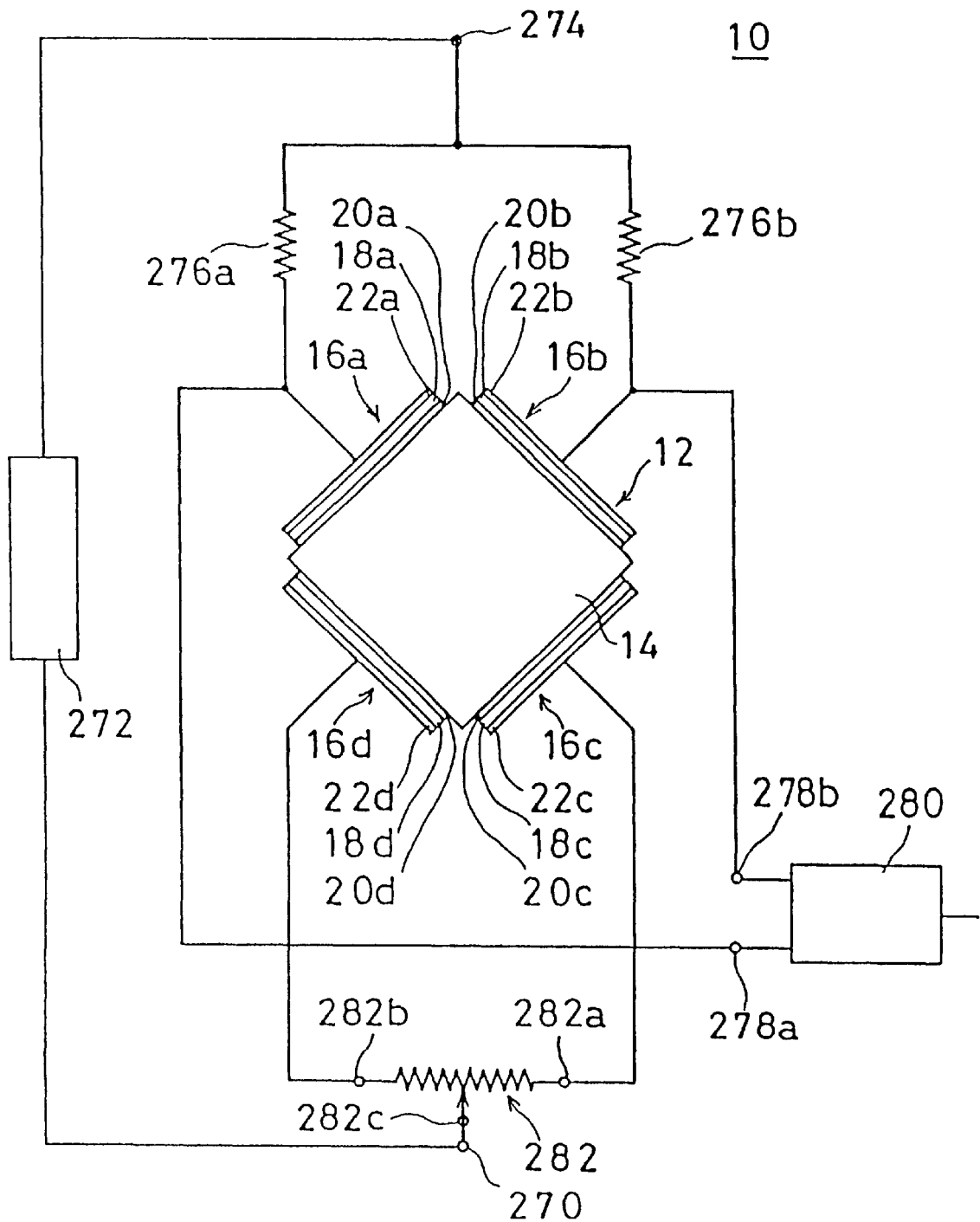
FIG. 41 is an illustrative view showing a modified embodiment of FIG. 40.

FIG. 41 is an illustrative view showing the modified embodiment of FIG. 40 In the embodiment, in particular, a vibrating body 14 is formed into a regular quadrangular prism, and piezoelectric elements 16a, 16b, 16c and 16d are formed respectively on four side surfaces of a vibrating body 14. The two adjoining piezoelectric elements 16a and 16b are used for driving, and the remaining two piezoelectric elements 16c and 16d are used for feedback. Therefore, the two feedback piezoelectric elements 16c and 16d are connected respectively to two fixed terminals 282a and 282b of a variable resistance 282, a movable terminal 282c of which is connected to the input end of an oscillator 272 via a feedback terminal 270. Thus, in this embodiment, outputs from the two feedback piezoelectric elements 16c and 16d are fed back to the two driving piezoelectric elements 16a and 16b in composite form.

In each of the vibrators shown in FIGS. 40 and 41, though the vibrator 14 is formed into a regular triangular prism or a regular quadrangular prism, it may be formed into an isosceles triangular prism. In this case, piezoelectric elements formed on the two identical side surfaces are used for driving and a piezoelectric element formed on the other side surface is used for feedback. The vibrating body 14 may also take the form of a polygonal prism besides the isosceles triangular prism and regular quadrangular prism. In this case, the piezoelectric elements are formed respectively on, at least, three side surfaces of the vibrating body, and two or more piezoelectric elements may be used for driving and one or more remaining piezoelectric elements may be used for feedback. In such a vibrator, when outputs from one or more feedback piezoelectric elements are fed back to two or more driving piezoelectric elements, the vibrator is driven by these driving piezoelectric elements and the vibrating body is vibrated in the composite direction of the driving directions. Since the vibrating body is vibrated as such by two or more driving piezoelectric elements, the amplitude of the vibrating body is larger as compared with the case wherein the vibrating body is driven by one driving piezoelectric element. Accordingly, a highly sensitive vibratory gyroscope which is hardly influenced by external unnecessary vibrations can be obtained. Since the vibrating body is driven from two directions and can be vibrated in the composite direction of the driving direction, a stable vibrating attitude can be obtained against mechanical state variation such as variation with time and variations of temperature, mounting angle and gravity (center of gravity) of the vibrating body and its supporting member or supporting base, as compared with the case when a gyroscope is driven by one driving piezoelectric element in so-called one-way driving. Accordingly, such vibrators can be preferably used in an apparatus having a basic vibrating attitude which must be stable for detecting fine vibrations such as a vibratory gyroscope.

Figure 42:
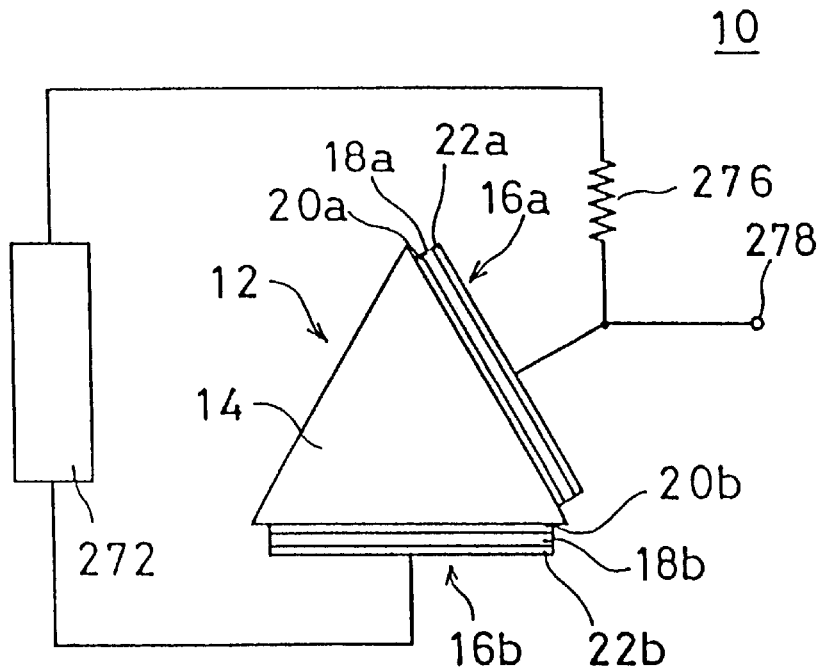
FIG. 42 is an illustrative view showing another modified embodiment of FIG. 40.

FIG. 42 is an illustrative view showing another modified embodiment of FIG. 40. In the embodiment, a vibrating body 14 is formed into a regular triangular prism, and on two side surfaces thereof, piezoelectric elements 16a and 16b are formed respectively. One piezoelectric element 16a is used for driving and the other piezoelectric element 16b is used for feedback. Accordingly, to an electrode 22a on the input side of the driving piezoelectric element 16a, a detecting terminal 278 for detecting the rotational angular velocity is connected.

In the embodiment, an electrode 22b of the feedback piezoelectric element 16b is connected to an input end of an oscillator 272, an output end of which is connected to the electrode 22a of the driving piezoelectric element 16a via fixed resistance 276.

Figure 43:
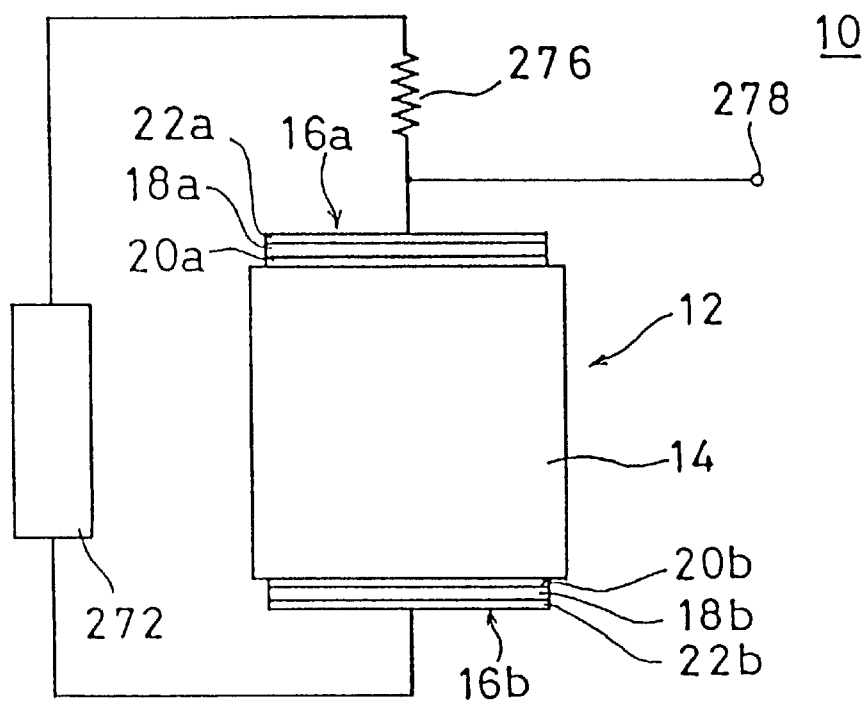
FIG. 43 is an illustrative view showing a modified embodiment of FIG. 42.

FIG. 43 is an illustrative view showing the modified embodiment of FIG. 42. In this embodiment, a vibrating body 14 is formed into a regular quadrangular prism, and on the two opposing side surfaces thereof, piezoelectric elements 16a and 16b are formed respectively. One piezoelectric element 16a is used for driving and the other piezoelectric element 16b is used for feedback. Therefore, also in this embodiment, as with the embodiment shown in FIG. 42, to an electrode 22a on the input side of the driving piezoelectric 16a, a detecting terminal 278 for detecting the rotational angular velocity is connected, and between the feedback piezoelectric element 16b and the driving piezoelectric element 16a, an oscillator 272 and a fixed resistance 276 connected in series are connected.

In the embodiments shown in FIGS. 40 through 43, though the vibrating body 14 is formed into a regular triangular prism or a regular quadrangular prism, it may take the form of a polygonal prism other than the regular triangular and quadrangular prisms. Also in this case, if a detecting terminal is connected to the input side of a driving piezoelectric element formed on the side surface of the vibrating body, the output corresponding to the rotational angular velocity can be obtained from the detecting terminal without passing through the piezoelectric element. Accordingly, since the output corresponding to the rotational angular velocity can be obtained without passing through the piezoelectric element, even if characteristic deviations, variations with time and temperature variations occur in the piezoelectric element, the rotational angular velocity can be measured accurately without being influenced by characteristics of the piezoelectric element.

Figure 44:
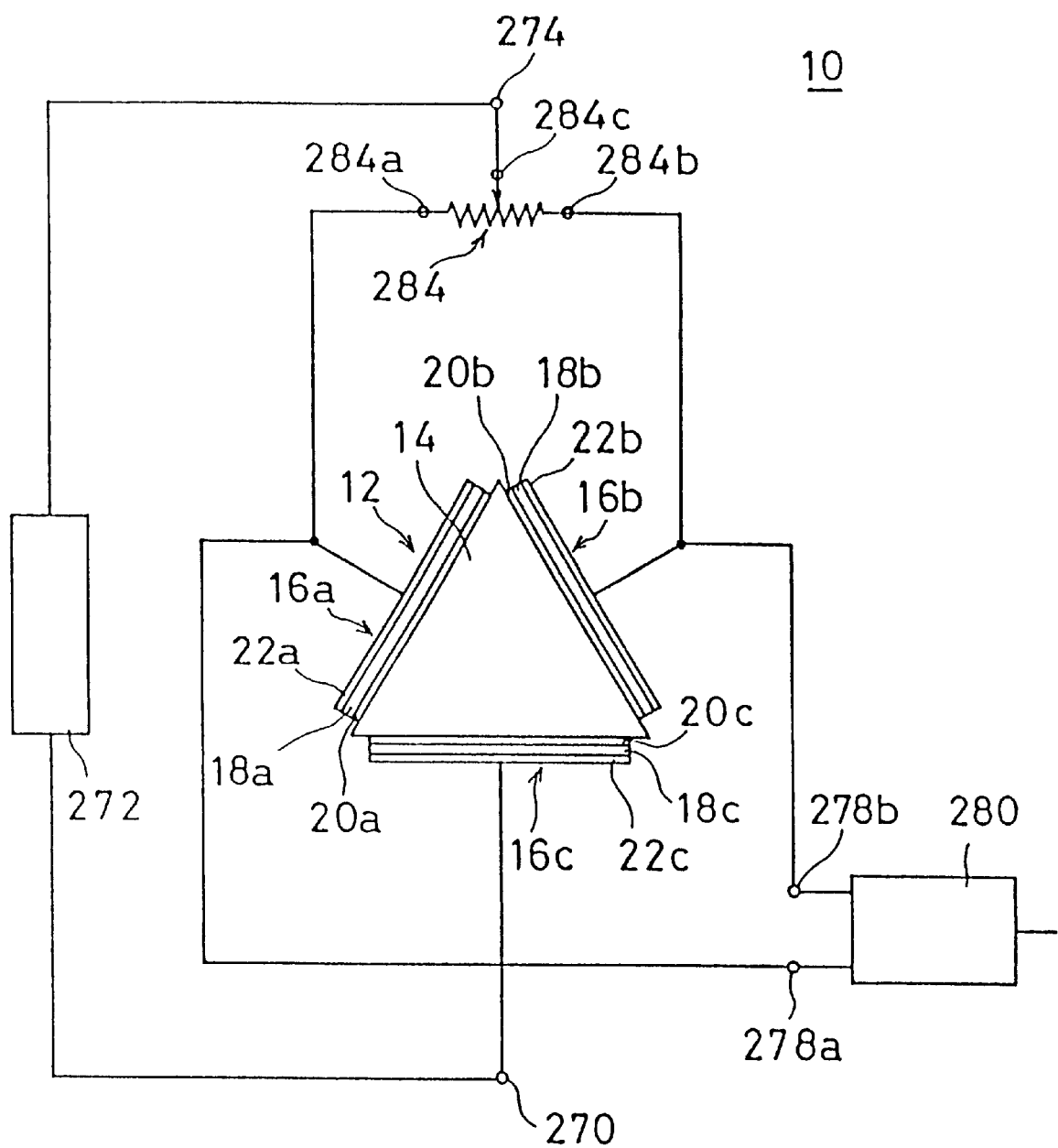
FIG. 44 is an illustrative view showing still another modified embodiment of FIG. 40.

FIG. 44 is an illustrative view showing still another modified embodiment of FIG. 40. In the vibratory gyroscope 10, to electrodes 22a and 22b of two driving piezoelectric elements 16a and 16b, fixed terminals 284a and 284b of a variable resistance 284 are connected respectively. To a movable terminal 234c of the variable resistance 284, a driving terminal 274 is connected.

When the vibrating gyroscope 10 is driven, from the detecting terminal 278a and 278b, the output voltage corresponding to the rotational angular velocity is obtained. In this case, if the variable resistance 284 is controlled to make the product C1•R1 of the electrostatic capacitance value C1 of the driving piezoelectric element 16a and the resistance value R1 from one fixed terminal 284a to the movable terminal 284c of the variable resistance 284, and the product C2•R2 of the electrostatic capacitance value C2 of the driving piezoelectric element 16b and the resistance value R2 from the other fixed terminal 284b to the movable terminal 284c of the variable resistance 284 substantially equal, the in-phase output voltage can be obtained from the detecting terminals 278a and 278b without being influenced by dispersions of the electrostatic capacitance values of the driving piezoelectric elements 16a and 16b, and deviations of the resonance frequencies associated therewith.

In the vibratory gyroscope 10, even if the dispersions of the electrostatic capacitance values or the deviations of the resonance frequencies associated therewith occur in the piezoelectric element, output voltages from the detecting terminals 278a and 278b, may be put in phase. Accordingly, the potential difference between the detecting terminals 278a and 278b or the output from the differential amplifier 280 at standstill (at non-rotation) can be made zero. At rotation, by detecting the potential difference between the detecting terminals 278a and 278b by a synchronizing detection circuit, a positive or negative signal corresponding to the rotational angular velocity can be obtained. Thus, in the vibratory gyroscope 10, the rotational angular velocity can be measured accurately.

FIG. 45 is an illustrative view showing the modified embodiment of FIG. 44. In the embodiment, as compared with the embodiment shown in FIG. 44, in particular, though the constructions of a vibrating body 14, piezoelectric elements 16a–16c and a variable resistance 284 are the same, it is only different in that two piezoelectric elements 16a and 16b are used for feedback and the remaining piezoelectric element 16c is used for driving.

Therefore, in this embodiment, a driving terminal 274 is connected to an electrode 22c of the piezoelectric element 16c. A feedback terminal 270 is connected to a movable terminal 284c of the variable resistance 284.

Also, in this embodiment, since the output voltage corresponding to the rotational angular velocity is obtained from the feedback piezoelectric elements 16a and 16b, to electrodes 22a and 22b of the piezoelectric elements 16a and 16b, detecting terminals 278a and 278b are connected respectively.

In the embodiment, if the variable resistance 284 is controlled so as to make the product C1•R1 of the electrostatic capacitance value C1 of the piezoelectric element 16a and the resistance value R1 from one fixed terminal 284a to the movable terminal 234c of the variable resistance 284, and the product C2•R2 of the electrostatic capacitance value C2 of the piezoelectric element 16b and the resistance value R2 from the other fixed terminal 284b to the movable terminal 284c of the variable resistance 284 substantially equal, in-phase output voltages can be obtained from the detecting terminals 278a and 278b without being influenced by dispersions of the electrostatic capacitance value of the piezoelectric elements 16a and 16b, and deviations of the resonance frequencies associated therewith.

Figure 46:
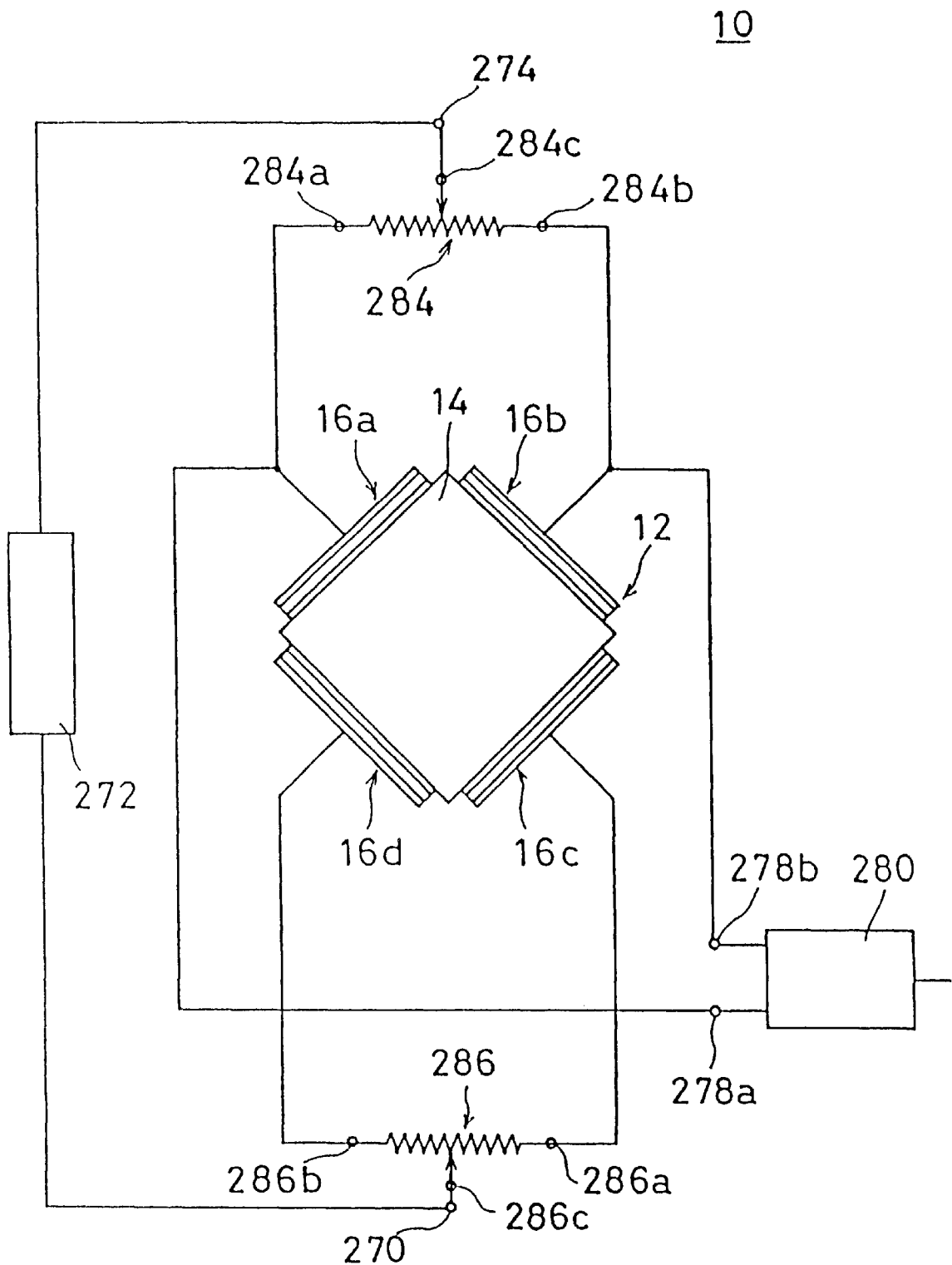
FIG. 46 is an illustrative view showing another modified embodiment of FIG. 44.

FIG. 46 is an illustrative view showing another modified embodiment of FIG. 44. In the embodiment, in particular, a vibrating body 14 is formed into a regular quadrangular prism, and on four side surfaces thereof, piezoelectric elements 16a, 16b, 16c and 16d are formed respectively. The two adjoining piezoelectric elements 16a and 16b are used for driving, and the remaining two piezoelectric elements 16c and 16d are used for feedback.

Accordingly, fixed terminals 284a and 284b of a variable resistance 284 are connected respectively to the driving piezoelectric element 16a and 16b, and to a movable terminal 284c of the variable resistance 284, a driving terminal 274 is connected. To the feedback piezoelectric elements 16c and 16d, two fixed terminals 286a and 286b of a separate variable resistance 286 are connected respectively, and to a movable terminal 286c thereof, a feedback terminal 270 is connected.

Also, in this embodiment, as with each of the embodiments of FIGS. 44 and 45, an oscillator 272 is connected to the feedback terminal 270 and the driving terminal 274. Thus, the vibratory gyroscope 10 also produces self-oscillation drive. In this case, output voltages corresponding to the rotational angular velocity are generated in the driving piezoelectric elements 16a and 16b.

Therefore, in the embodiment, the detecting terminals 278a and 278b are connected to the driving piezoelectric elements 16a and 16b. The detecting terminals 278a and 278b are connected to the input side of a differential amplifier 280.

Also, in this embodiment, as with the embodiment shown in FIG. 44, by controlling the variable resistance 284 connected to the driving piezoelectric elements, in-phase output voltages can be obtained from the detecting terminals 278a and 278b.

In the embodiment, since the output voltages corresponding to the rotational angular velocity is generated also from the feedback piezoelectric elements 16c and 16d, the detecting terminals 278a and 278b may be connected respectively to the feedback piezoelectric elements 16c and 16d. In this case, by controlling the separate variable resistance 286, in-phase output voltages are obtained from the detecting terminals 278a and 278b.

In each of the embodiments shown in FIGS. 44 through 46, though the vibrating body 14 is formed into regular triangular or regular quadrangular prisms, it may take the form of polygonal prism other than the regular triangular or regular quadrangular prisms. In this case, piezoelectric elements may be formed respectively on, at least, three side surfaces of the vibrating body, respectively connecting two fixed terminals of the variable resistance to the two piezoelectric elements, connecting two detecting terminals respectively to the two piezoelectric elements and using the movable terminal of the variable resistance for one of driving and feedback.

In this case, if the driving signal is applied to the movable terminal of the variable resistance to supply the driving signal to the two piezoelectric elements connected to the two fixed terminals of the variable resistance, or the output signal from these two piezoelectric elements is applied to the other piezoelectric elements through the movable terminal of the variable resistance, the vibratory gyroscope is driven, and the output voltages corresponding to the rotational angular velocity are obtained from the two detecting terminals. In this case, if the variable resistance value is controlled so as to make the product C1•R1 of the electrostatic capacitance value C1 of one of the two piezoelectric elements and the resistance value R1 from one fixed terminal connected to the piezoelectric elements to the movable terminal, and the product C2•R2 of the electrostatic capacitance value C2 of the other piezoelectric elements and the resistance value R2 from the other fixed terminal connected to the piezoelectric element to the movable terminal substantially equal, output voltages obtained from the two detecting terminals are in phase.

Accordingly, since the output voltages from the two detecting elements can be put in phase without being influenced by dispersions of the electrostatic capacitance value of the piezoelectric element and deviations of the resonance frequencies associated therewith, the rotational angular velocity can be measured accurately.

Figure 47:
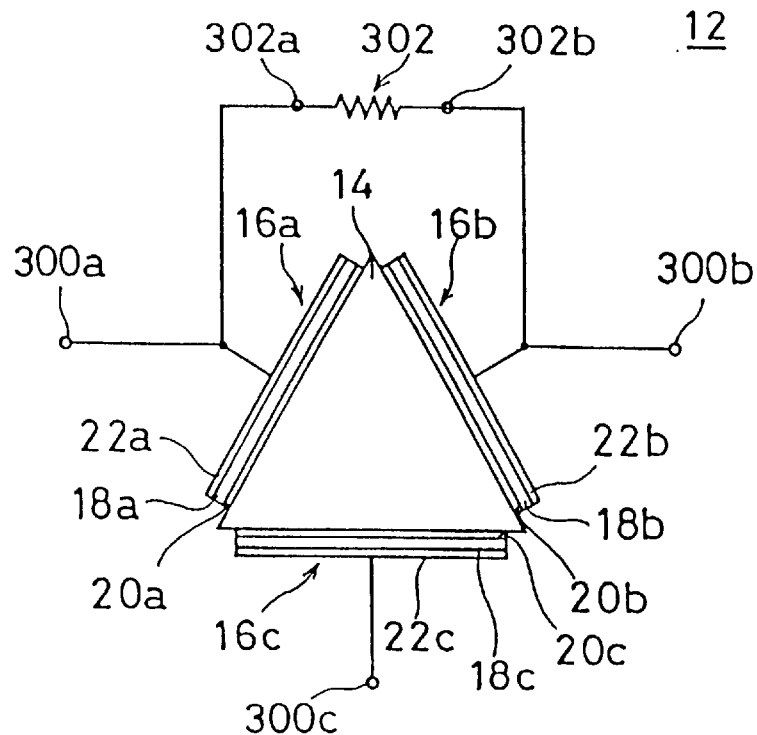
FIG. 47 is an illustrative view showing a separate example of a vibrator according to the present invention.

FIG. 47 is an illustrative view showing a separate example of a vibrator according to the present invention. The vibrator 12 includes a regular triangular prism shaped vibrating body 14.

On the vibrating body 14, piezoelectric elements 16a, 16b and 16c are formed respectively in the center of three side surfaces thereof.

To electrodes 22a, 22b and 22c of the piezoelectric elements, three terminals 300a, 300b and 300c are connected respectively. Moreover, to the electrodes 22a and 22b of the piezoelectric elements 16a and 16b, opposite ends 302a and 302b of a fixed resistance 302 are connected respectively. The fixed resistance 302 is designed to balance characteristics between the piezoelectric elements 16a and 16b. That is, in the vibrator to which such a resistance is not connected, the characteristics between the piezoelectric elements may be unbalanced by dispersions of the electrostatic capacitance value of the piezoelectric element and deviations of the resonance frequencies associated therewith, but in this embodiment, the characteristics between the piezoelectric elements 16a and 16b are well balanced.

In the vibrator 12, the two piezoelectric elements 16a and 16b provided with the fixed resistance 302 are used for one of driving and detection, and the other piezoelectric element 16c is used for the other of driving and detection. Thus, in the vibrator 12, if the driving signal is applied to the terminals 300a and 300b or the piezoelectric elements 16a and 16b, a stable output signal is obtained from the piezoelectric element 16c or the terminal 300c. Conversely, if the driving signal is applied to the terminal 300c of the piezoelectric element 16c, stable output signals are obtained from the piezoelectric elements 16a and 16b or the terminals 300a and 300b.

For using the vibrator 12 in a vibratory gyroscope, the driving signal may be applied to the piezoelectric element as aforementioned to measure the rotation angular velocity by the output signal obtained from the other piezoelectric element under this condition. At this time, when the output signals are obtained from the two piezoelectric elements 16a and 16b, the rotational angular velocity may be measured from the output signal difference, for example, by a differential amplifier.

Figure 48:
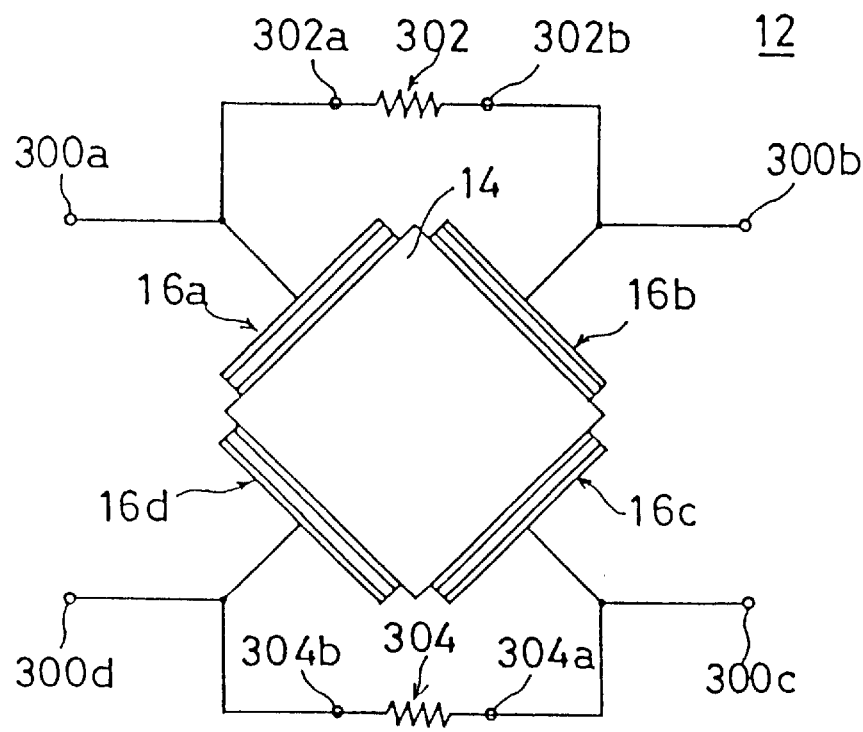
FIG. 48 is an illustrative view showing a modified embodiment of FIG. 47.

FIG. 48 is an illustrative view showing the modified embodiment of FIG. 47. In this embodiment, in particular, a vibrating body 14 is formed into a regular quadrangular prism, and on four side surfaces thereof, piezoelectric elements 16a, 16b, 16c and 16d are formed respectively. To the piezoelectric elements 16a, 16b, 16c and 16d, terminals 300a, 300b, 300c and 300d are connected respectively.

To the two adjoining piezoelectric elements 16a and 16b, opposite ends 302a and 302b of a fixed resistance 302 are connected respectively for improving the characteristics balance therebetween. Thus, the characteristics between the piezoelectric elements 16a and 16b are well balanced by the fixed resistance 302.

Similarly, to the other adjoining piezoelectric elements 16c and 16d, opposite ends 304a and 304b of another fixed resistance 304 are connected respectively, and the characteristic balance between the piezoelectric elements 16c and 16d is improved by the fixed resistance 304.

In the vibrator 12, the two piezoelectric elements 16a and 16b provided with the fixed resistance 302 are used for one of driving and detection, and the piezoelectric elements 16c and 16d provided with the other fixed resistance 304 are used for the other of driving and detection.

In the vibrator 12, if the driving signal is applied to the piezoelectric elements 16a and 16b, stable output signals are output from the piezoelectric elements 16c and 16d, and conversely, if the driving signal is applied to the piezoelectric elements 16c and 16d, stable output signals are obtained from the piezoelectric elements 16a and 16b.

Accordingly, the vibrator 12 can also be preferably used in an apparatus utilizing fine variations of the vibrator such as a vibratory gyroscope.

Figure 49:
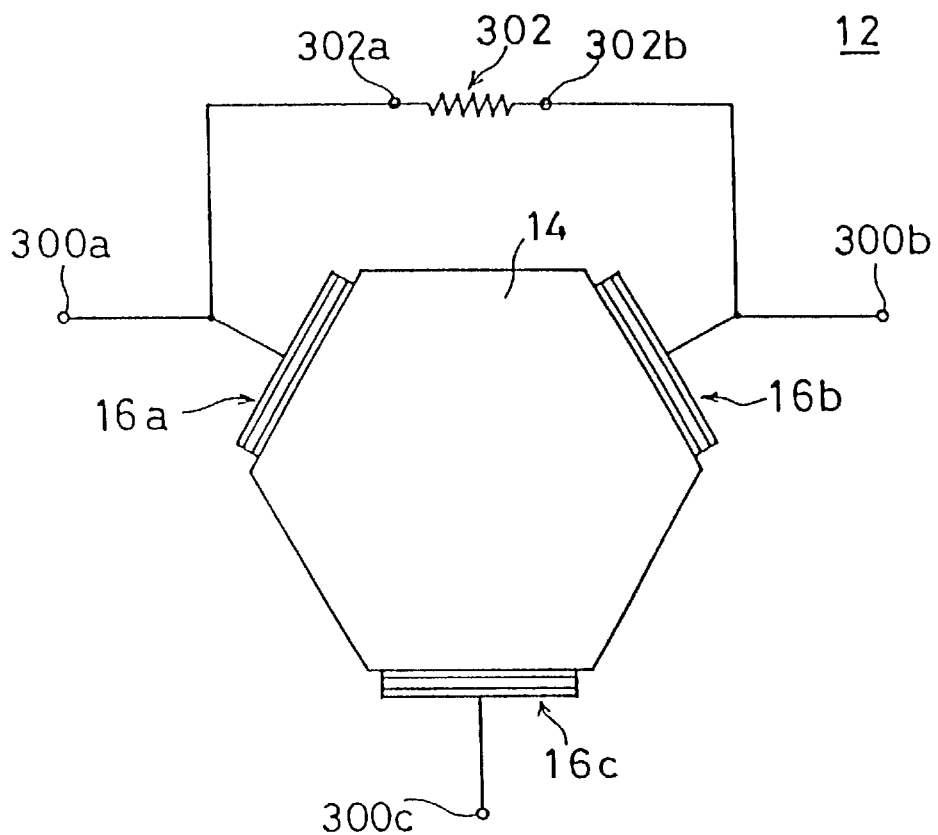
FIG. 49 is an illustrative view showing another modified embodiment of FIG. 47.
Figure 50:
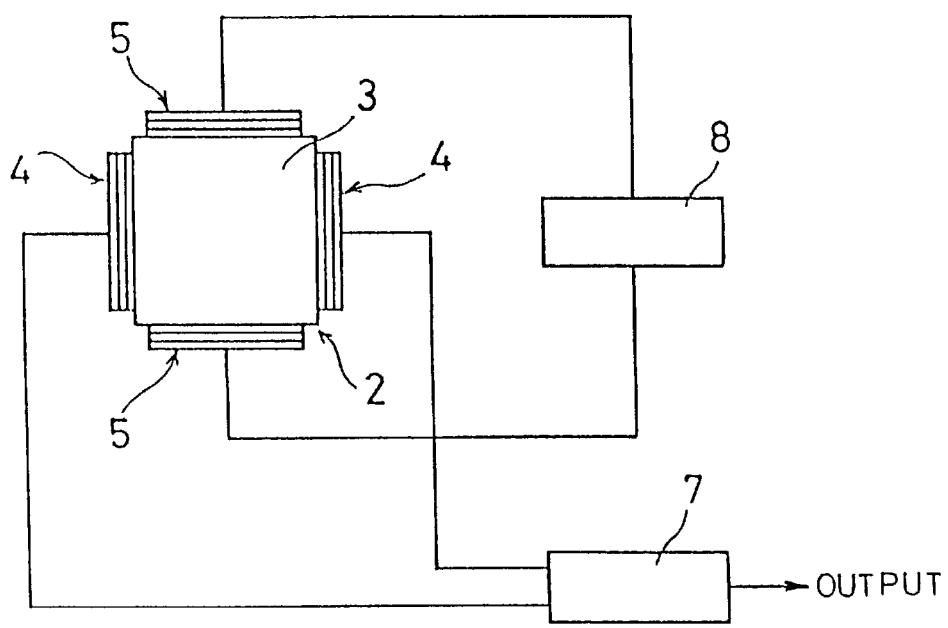
FIG. 50 is an illustrative view showing an example of the conventional vibratory gyroscope showing the background of the present invention.
Figure 51:
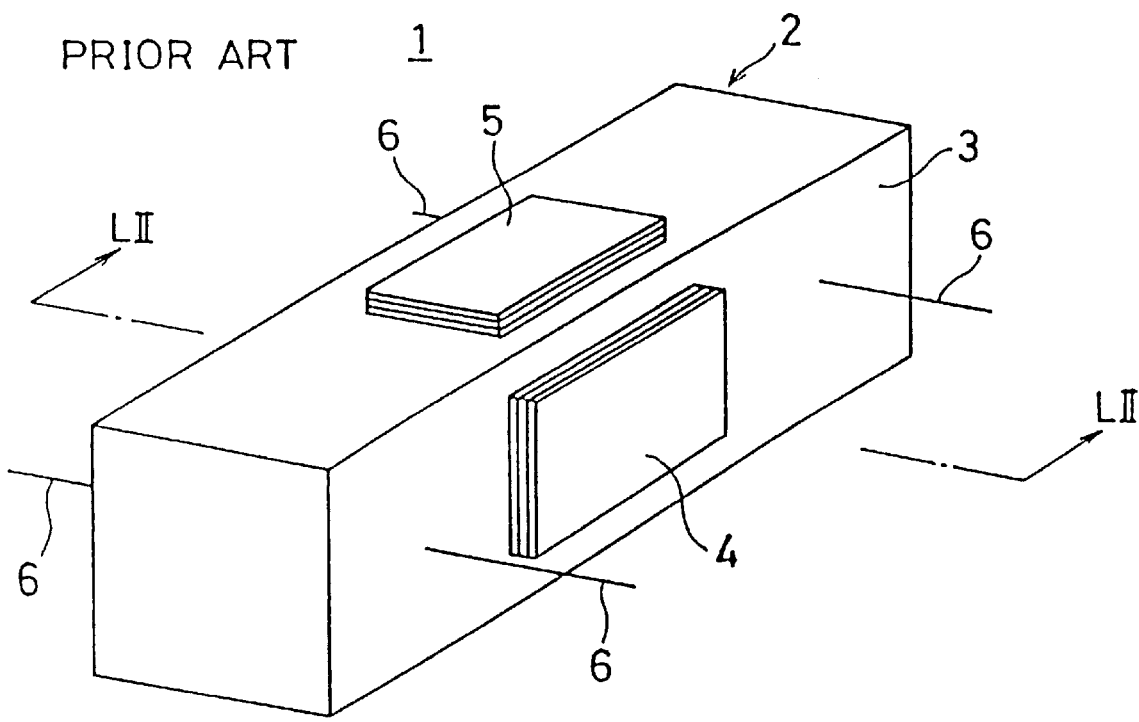
FIG. 51 is a perspective view of a vibrator of the vibratory gyroscope of FIG. 50.
Figure 52:
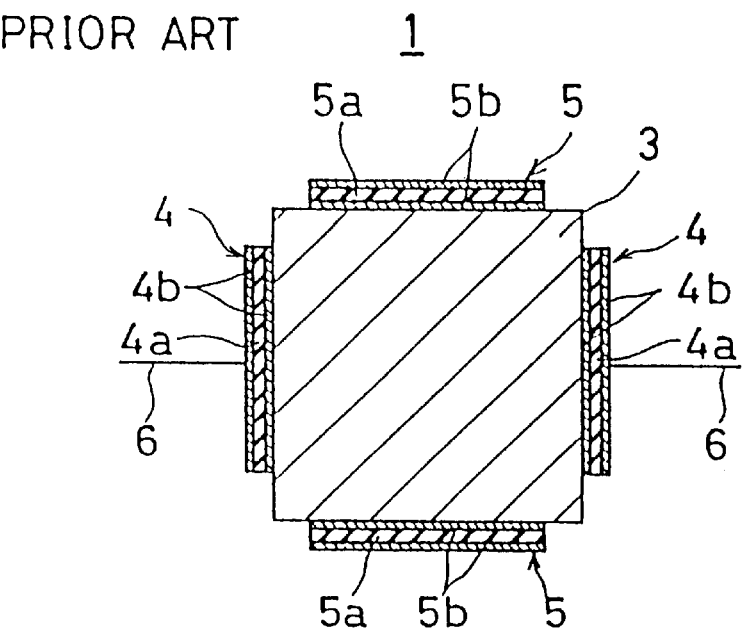
FIG. 52 is a sectional view taken along the line LII—LII of FIG. 51.
Figure 53:
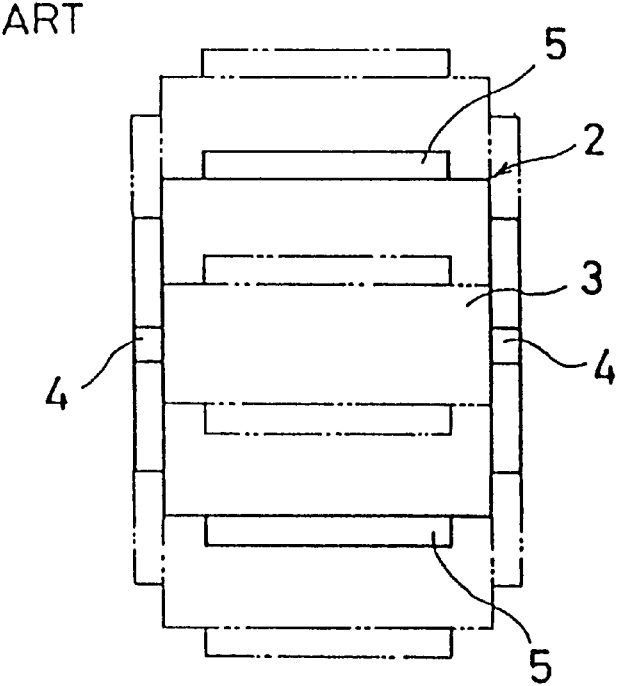
FIG. 53 is an illustrative view showing the vibration when the conventional vibratory gyroscope shown in FIG. 50 is not rotating.
Figure 54:
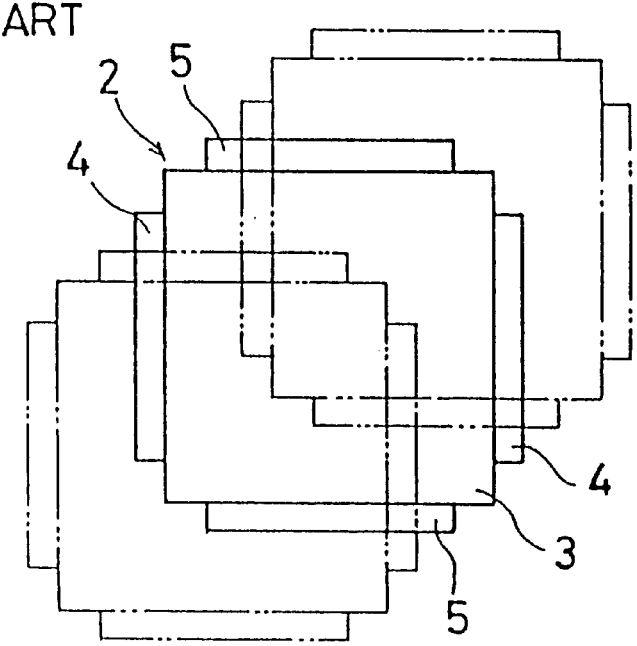
FIG. 54 is an illustrative view showing the vibration when the conventional vibratory gyroscope shown in FIG. 50 is rotating.

FIG. 49 is an illustrative view showing another modified embodiment of FIG. 47. In the embodiment, a vibrating body 14 is formed into a regular hexagonal prism, and to three side surfaces thereof not adjoined, piezoelectric elements 16a–16c are formed respectively. To the piezoelectric elements 16a–16c, terminals 300a–300c are connected respectively. Moreover, to the piezoelectric elements 16a and 16b, opposite ends 302a and 302b of a fixed resistance 302 are connected respectively.

In this embodiment, as with the embodiment shown in FIG. 47, the two piezoelectric elements 16a and 16b are used for one of driving and detection, and the other piezoelectric element 16c is used for the other of driving and detection. Also in this embodiment, since the characteristics balance between the two piezoelectric elements 16a and 16b is improved, it is preferably used in an apparatus such as a vibratory gyroscope.

In each of the embodiments shown in FIGS. 47 through 49, though the vibrating body 14 is formed into a regular triangular prism, a regular quadrangular prism or a regular hexagonal prism, it may be take the form of an isosceles triangular prism. In this case, the resistance is connected to the piezoelectric elements formed on the two identical side surfaces of the vibrating body 14 and the piezoelectric elements may be used for driving or detection. The vibrating body 14 may also be formed into a polygonal prism other than the isosceles triangular prism, regular quadrangular prism or regular hexagonal prism. In this case, piezoelectric elements may be formed, at least, on three side surfaces of the vibrating body. Then, a resistance may be connected to the two piezoelectric elements so as to be used for one of driving and detection, and the other piezoelectric element may be used for the other of driving and detection.

In this arrangement, the characteristic balance between the two piezoelectric elements connected thereto is improved by the resistance.

Accordingly, such a vibrator involves stable characteristics without being influenced by dispersions of the electrostatic capacitance values of the two piezoelectric elements used for driving or detection and the resonance frequencies associated therewith.

Thus, the vibrator is preferably used in an apparatus utilizing fine variations of the vibrator such as a vibratory gyroscope. For example, when the vibrator is used in the vibratory gyroscope, a rotational angular velocity can be measured accurately.

While the present invention has been particularly described and illustrated, it will be obvious that it is merely illustrative and restrictive, the spirit and scope of the present invention is therefore limited solely by the appended and claims.

What is claimed is:

1. A method of forming a vibrating gyroscope comprising the steps of:
   providing a vibrating body;
   disposing at least one driving member on said vibrating body so that the at least one driving member is arranged to generate vibration in said vibrating body in a vibrating direction that is substantially perpendicular to an axis of said vibrating body; and
   disposing at least two detection members on said vibrating body such that the at least two detection members are spaced from each other, located on opposite sides of a plane including said axis and said vibrating direction of said vibrating body, arranged to detect a rotational angular velocity applied to said vibrating body and arranged in a non-parallel relationship relative to each other and in a non-parallel relationship relative to the at least one driving member.

2. The method according to claim 1, wherein said vibrating body is a ceramic body.

3. The method according to claim 1, wherein said vibrating body is a metal body.

4. The method according to claim 1, wherein said at least two detection members each comprises a piezoelectric body.

5. The method according to claim 1, wherein said at least two detection members each comprises a metal body.

6. The method according to claim 1, wherein said vibrating body has a substantially rod shape.

7. The method according to claim 1, wherein said vibrating body has a substantially triangular shape.

8. The method according to claim 1, wherein said vibrating body has a substantially polygonal shape.

9. The method according to claim 1, wherein said at least two detection members each comprises a piezoelectric member surrounded by two conductive electrodes.

10. The method according to claim 1, wherein said at least one driving member includes at least one electrode.

11. The method according to claim 1, wherein each of said at least two detection members includes at least one electrode.

12. The method according to claim 1, further comprising the step of connecting a differential amplifier to said at least two detection members such that the differential amplifier receives signals from said at least two detection members and outputs a signal indicative of a Coriolis force by canceling detection signals received from said vibrating body by said at least two detection members.

13. The method according to claim 1, wherein the step of disposing said at least two detection members includes the step of arranging said at least two detection members such that a sum of signals output by said at least two detection members is transmitted to the at least one driving member.

14. The method according to claim 1, wherein said step of disposing said at least two detection members includes the step of arranging said at least two detection members to detect vibration and a Coriolis force of said vibrating body and to feedback signals representing a detected vibration but not a detected Coriolis force to said at least one driving member.

15. The method according to claim 14, further comprising the step of connecting a differential amplifier to said at least one of said at least two detection members to output a signal representative of only said detected Coriolis force.

16. The method according to claim 15, wherein said step of disposing said at least two detection members includes the step of arranging said at least two detection members such that a sum of signals output by said at least two detection members is transmitted to the at least one driving member.

17. A method of forming a vibrating gyroscope comprising the steps of:

providing a vibrating body;

disposing at least one driver on said vibrating body such that the vibrating body vibrates in a vibrating direction that is substantially perpendicular to an axis of said vibrating body;

disposing at least two detectors on said vibrating body such that said two detectors are spaced from each other on said vibrating body, located on opposite sides of a plane including said axis and said vibrating direction of said vibrating body, said at least two detectors are arranged to detect a rotational angular velocity applied to said vibrating body and arranged in a non-parallel relationship relative to said at least one driver and at least one of said at least two detectors is arranged to be substantially perpendicular to said vibrating direction.

18. The method according to claim 17, wherein said at least two detectors are arranged in a non-parallel relationship relative to each other.

19. The method according to claim 17, wherein said vibrating body is a ceramic body.

20. The method according to claim 17, wherein said vibrating body is a metal body.

21. The method according to claim 17, wherein said at least two detectors each comprises a piezoelectric body.

22. The method according to claim 17, wherein said at least two detectors each comprises a metal body.

23. The method according to claim 17, wherein said vibrating body has a substantially rod shape.

24. The method according to claim 17, wherein said vibrating body has a substantially triangular shape.

25. The method according to claim 17, wherein said vibrating body has a substantially polygonal shape.

26. The method according to claim 17, wherein said at least two detectors each comprises a piezoelectric member surrounded by two conductive electrodes.

27. The method according to claim 17, wherein said at least one driver includes at least one electrode.

28. The method according to claim 17, wherein each of said at least two detectors includes at least one electrode.

29. The method according to claim 17, further comprising the step of connecting a differential amplifier to said at least two detectors such that the differential amplifier receives signals from said at least two detectors and outputs a signal indicative of a Coriolis force by canceling detection signals received from said vibrating body by said at least two detectors.

30. The method according to claim 17, wherein the step of disposing said at least two detectors includes the step of arranging said at least two detectors such that a sum of signals output by said at least two detectors is transmitted to said at least one driver.

31. The method according to claim 17, wherein said step of disposing said at least two detectors includes the step of arranging said at least two detectors to detect vibration and a Coriolis force of said vibrating body and to feedback signals representing a detected vibration but not a detected Coriolis force to said at least one driver.

32. The method according to claim 31, further comprising the step of connecting a differential amplifier to said at least one of said at least two detectors to output a signal representative of only said detected Coriolis force.

33. The method according to claim 32, wherein said step of disposing said at least two detectors includes the step of arranging said at least two detectors such that a sum of signals output by said at least two detectors is transmitted to said at least one driver.

34. A method of forming a vibrating gyroscope comprising the steps of:

providing a vibrating body;

disposing at least one driving member on said vibrating body to vibrate said vibrating body in a vibrating direction that is substantially perpendicular to an axis of said vibrating body and to generate a Coriolis force in said vibrating body; and disposing at least two detection members spaced from each other and operatively connected to said vibrating body, said at least two detection members being located on opposite sides of a plane including said axis and a vibrating direction of said vibrating body such that said at least two detection members detect vibration of said vibrating body at substantially the same amount and detect at a different amount said Coriolis force generated by a rotational angular velocity applied to said vibrating body; and connecting a differential amplifier circuit to said at least two detection members, the differential amplifier circuit receiving signals from said at least two detection members and outputting a signal indicative of said Coriolis force by canceling detection signals received from said vibration body at said at least two detection members.

35. A method of forming a vibrating gyroscope comprising the steps of:

providing a vibrating body;

disposing at least one driving member on said vibrating body to vibrate said vibrating body in a vibrating direction that is substantially perpendicular to an axis of said vibrating body and to generate a Coriolis force in said vibrating body; and disposing at least two detection members on said vibrating body such that said at least two detection members are spaced from each other on said vibrating body, located on opposite sides of a plane including said axis and said vibrating direction of said vibrating body, arranged to detect vibration of said vibrating body and said Coriolis force and to feedback signals representing a detected vibration but not a detected Coriolis force to said at least one driving member.

36. A method of forming a vibrating gyroscope comprising the steps of:

providing a vibrating body;

disposing at least one driver on said vibrating body to vibrate said vibrating body in a vibrating direction that is substantially perpendicular to an axis of said vibrating body;

disposing at least two detectors located spaced from each other on said vibrating body on said vibrating body such that said at least two detectors are on opposite sides of a plane including said axis and said vibrating direction of said vibrating body and arranged to detect vibration of said vibrating body and said Coriolis force; and connecting a differential amplifier circuit to said at least two detectors such that the differential amplifier receives signals from said at least two detectors and eliminates a detected vibration signal therefrom and outputs a Coriolis force signal.

* * * * *